(12) United States Patent
Ma et al.

(10) Patent No.: US 6,981,602 B2
(45) Date of Patent: Jan. 3, 2006

(54) TAMPER EVIDENT BOTTLE CAP

(75) Inventors: Mike Xiaoli Ma, San Jose, CA (US); Brian M. Adams, Newark, CA (US)

(73) Assignee: Portola Packaging, Inc., San Jose, CA (US)

( * ) Notice: Subject to any disclaimer, the term of this patent is extended or adjusted under 35 U.S.C. 154(b) by 0 days.

(21) Appl. No.: 10/266,091

(22) Filed: Oct. 4, 2002

(65) Prior Publication Data
US 2003/0071007 A1 Apr. 17, 2003

Related U.S. Application Data

(63) Continuation-in-part of application No. 09/955,844, filed on Sep. 18, 2001, now Pat. No. 6,766,916, which is a continuation-in-part of application No. 09/900,505, filed on Jul. 5, 2001, now Pat. No. 6,484,896, which is a continuation-in-part of application No. 09/653,679, filed on Sep. 1, 2000, now abandoned, which is a continuation of application No. 09/323,571, filed on Jun. 1, 1999, now Pat. No. 6,112,923, which is a continuation-in-part of application No. 08/904,878, filed on Aug. 1, 1997, now Pat. No. 5,913,437.

(51) Int. Cl.
*B65D 41/32* (2006.01)

(52) U.S. Cl. .................................. 215/254; 215/256
(58) Field of Classification Search ................ 215/253, 215/254, 256
See application file for complete search history.

(56) References Cited

U.S. PATENT DOCUMENTS 3,329,295 A    7/1967  Fields
3,338,446 A *  8/1967  Faulstich ................ 215/254
4,196,818 A    4/1980  Brownbill
4,511,053 A    4/1985  Brandes et al.
4,526,282 A    7/1985  Dutt et al.

(Continued)

FOREIGN PATENT DOCUMENTS

DE             3912137 A1   10/1990

(Continued)

*Primary Examiner*—Stephen K. Cronin
(74) *Attorney, Agent, or Firm*—Dorsey & Whitney LLP

(57) ABSTRACT

A closure for sealing the opening of a container. The closure may include an angled plug. The container includes an external thread configuration and the closure includes an internal thread configuration which are adapted to pass over each other with one of the external and internal thread configurations having at least one thread lead and the other having at least twice as many thread leads. The closure includes an inwardly turned retaining rim extends at least partially upwardly. The retaining rim has an attachment boss and an upwardly extending line of weakness adjacent the attachment boss such that when the closure is removed from the container, the line of weakness tears allowing the tamper-evidencing band to remain with the closure upon removal from the container. The closure may include a top having a periphery, an annular skirt depending downwardly from the periphery and including a lower edge and a line of weakness extending upwardly from the lower edge, a tear tab extending downwardly from the skirt below the lower edge, and a tamper-evidencing locking member including an inwardly extending locking ring that extends radially inwardly from the skirt intermediate the top and the bottom edge, the retaining rim including a free edge that is adapted to engage the radially extending locking bead of the container when the closure is removed from the container neck. A method of molding a closure including a tamper-evidencing band is also disclosed.

11 Claims, 21 Drawing Sheets

U.S. PATENT DOCUMENTS

| | | |
|---|---|---|
| 4,664,278 A | 5/1987 | Barriac |
| 4,732,289 A | 3/1988 | Granat et al. |
| 4,801,031 A | 1/1989 | Barriac |
| 4,813,561 A | 3/1989 | Ochs |
| 4,875,594 A | 10/1989 | Ochs |
| 4,978,016 A | 12/1990 | Hayes |
| 4,981,230 A | 1/1991 | Marshall et al. |
| 5,076,453 A | 12/1991 | Odet |
| 5,105,960 A | 4/1992 | Crisci et al. |
| 5,105,961 A | 4/1992 | Noren et al. |
| 5,190,178 A | 3/1993 | Luch |
| 5,285,912 A | 2/1994 | Molinaro |
| 5,307,945 A | 5/1994 | Hidding et al. |
| 5,307,946 A | 5/1994 | Molinaro |
| 5,346,082 A | 9/1994 | Ochs et al. |
| 5,400,913 A | 3/1995 | Kelly |
| 5,415,306 A | 5/1995 | Luch et al. |
| 5,456,376 A | 10/1995 | Luch et al. |
| 5,465,876 A | 11/1995 | Crisci |
| 5,480,045 A | 1/1996 | Molinaro et al. |
| 5,533,633 A | 7/1996 | King |
| 5,570,798 A | 11/1996 | Hayashida et al. |
| 5,609,262 A | 3/1997 | Trout |
| 5,660,288 A | 8/1997 | Nyman, Jr. |
| 5,727,705 A | 3/1998 | Kelly |
| 5,749,484 A | 5/1998 | Trout |
| 5,775,527 A | 7/1998 | Bösl et al. |
| 5,868,281 A * | 2/1999 | Bietzer et al. ............. 222/83.5 |
| 6,015,054 A | 1/2000 | King et al. |
| 6,116,442 A | 9/2000 | Higgins |
| 6,177,041 B1 | 1/2001 | Bietzer |
| 6,276,543 B1 | 8/2001 | German et al. |

FOREIGN PATENT DOCUMENTS

| | | |
|---|---|---|
| EP | 0049876 A1 | 4/1982 |
| EP | 0341992 A1 | 11/1989 |
| FR | 2421812 A1 | 11/1979 |
| WO | WO 00/12402 A1 | 3/2000 |

* cited by examiner

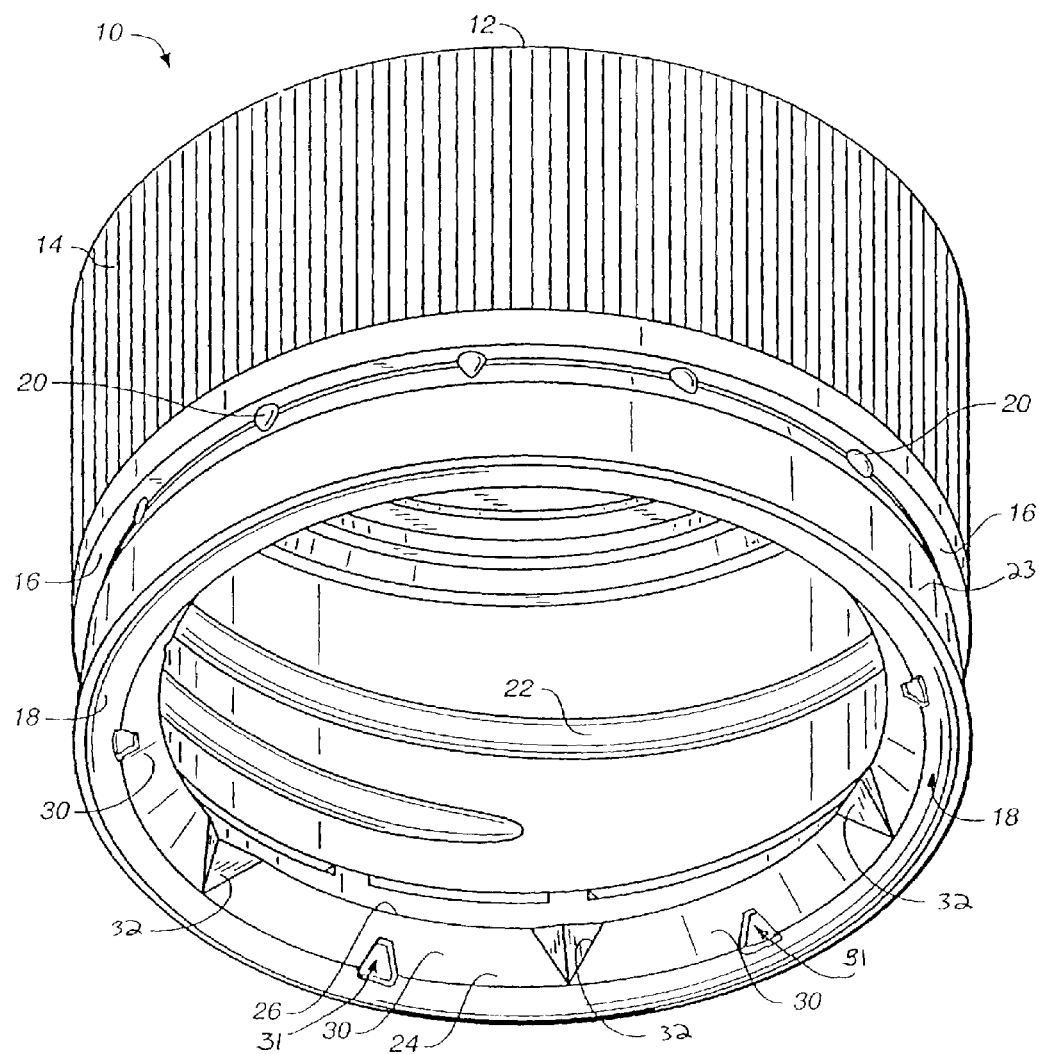
FIG._1

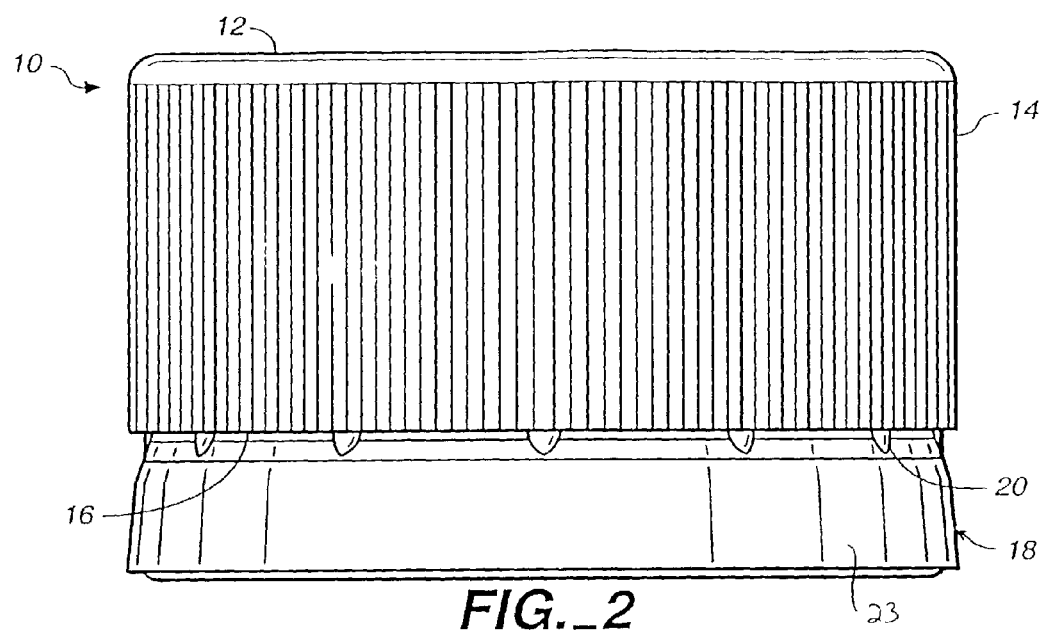
FIG._2
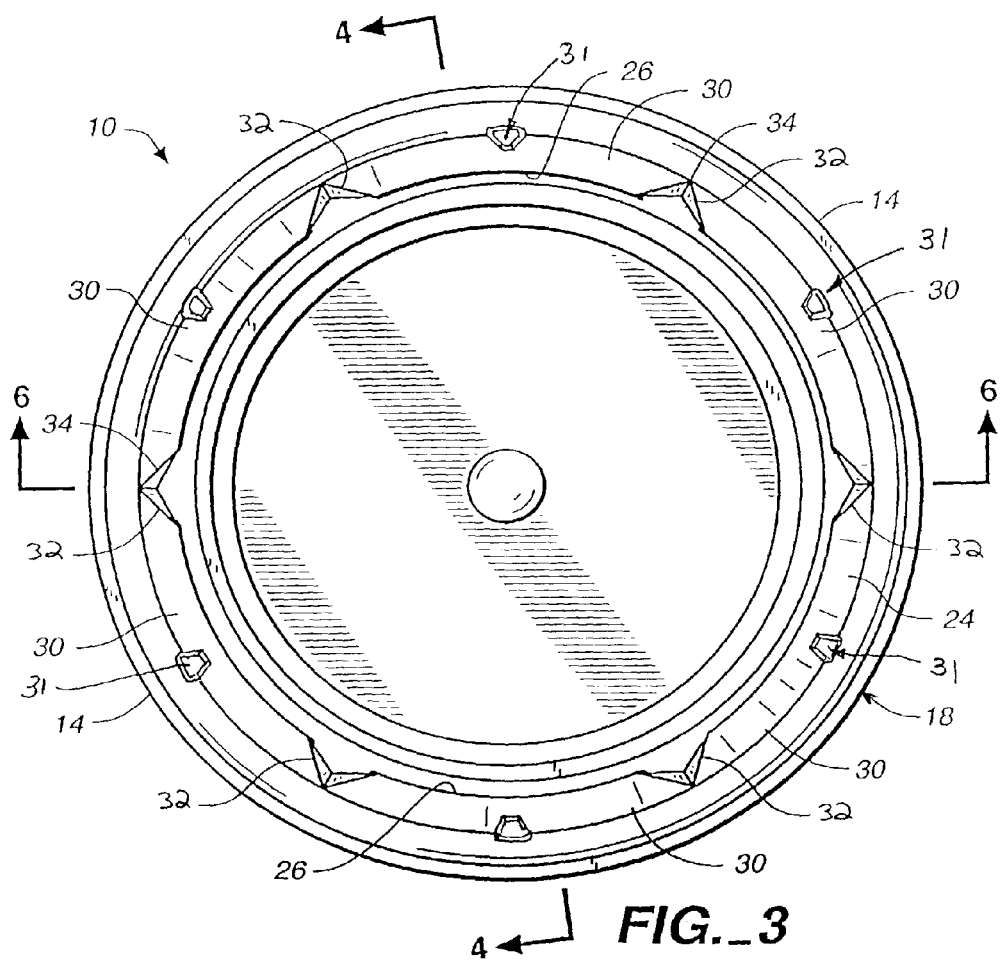
FIG._3

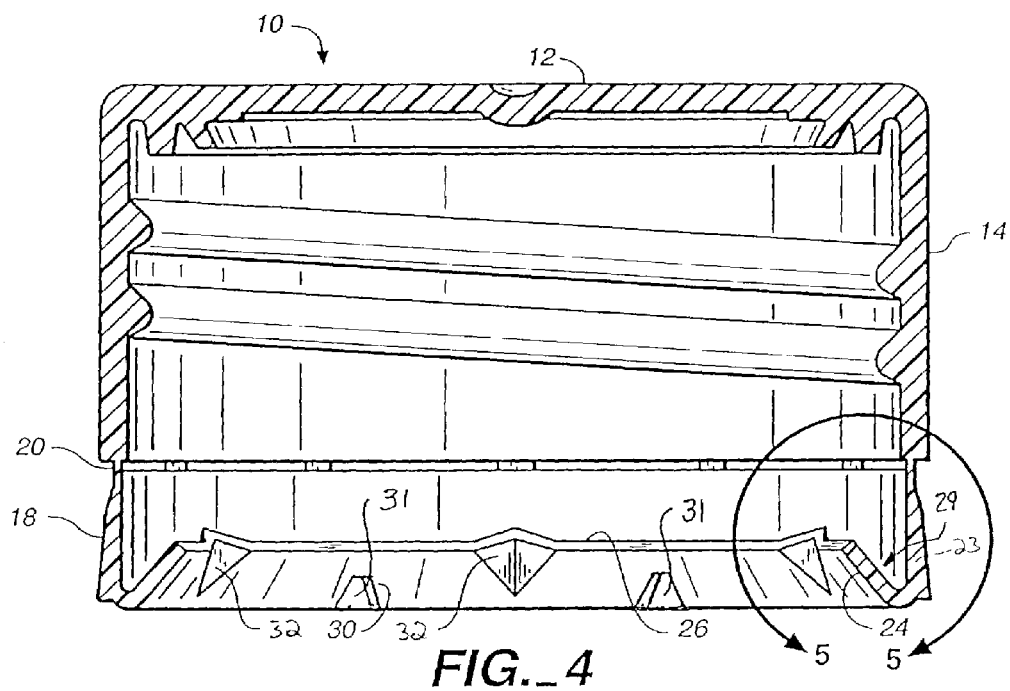
FIG._4
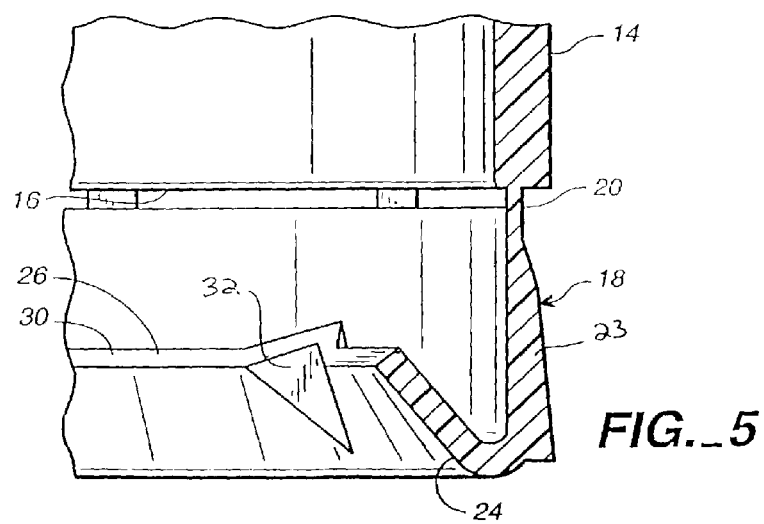
FIG._5

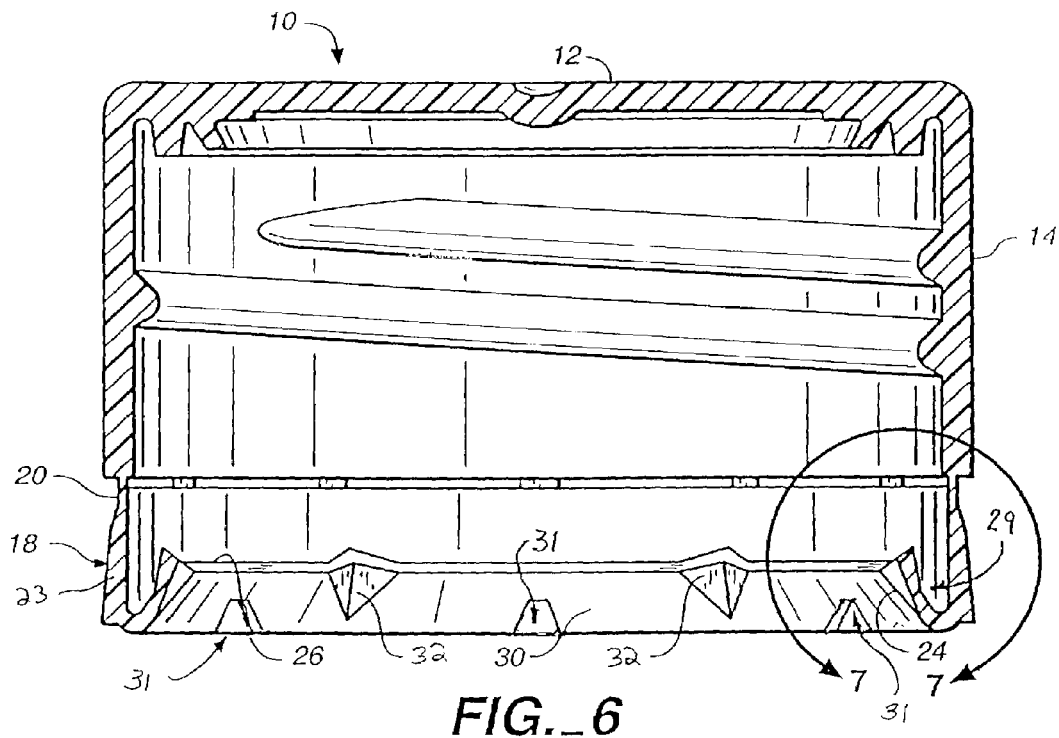
FIG._6
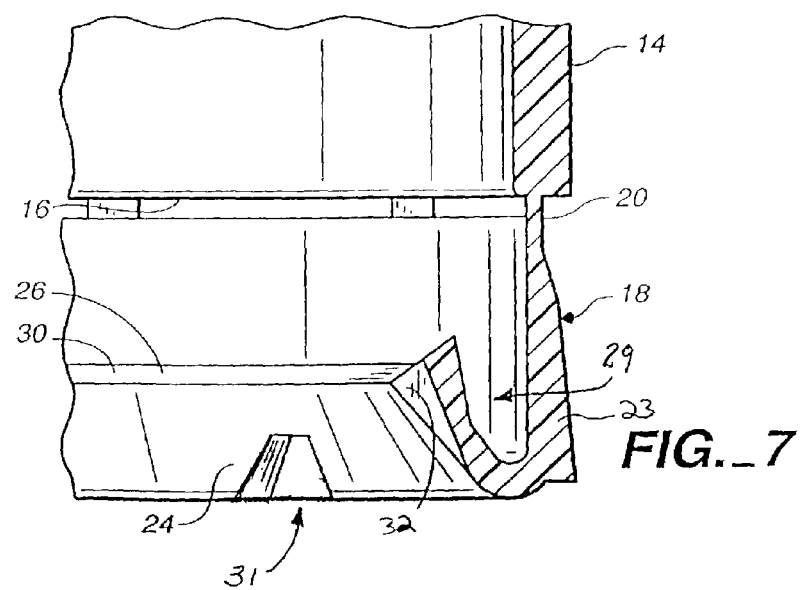
FIG._7

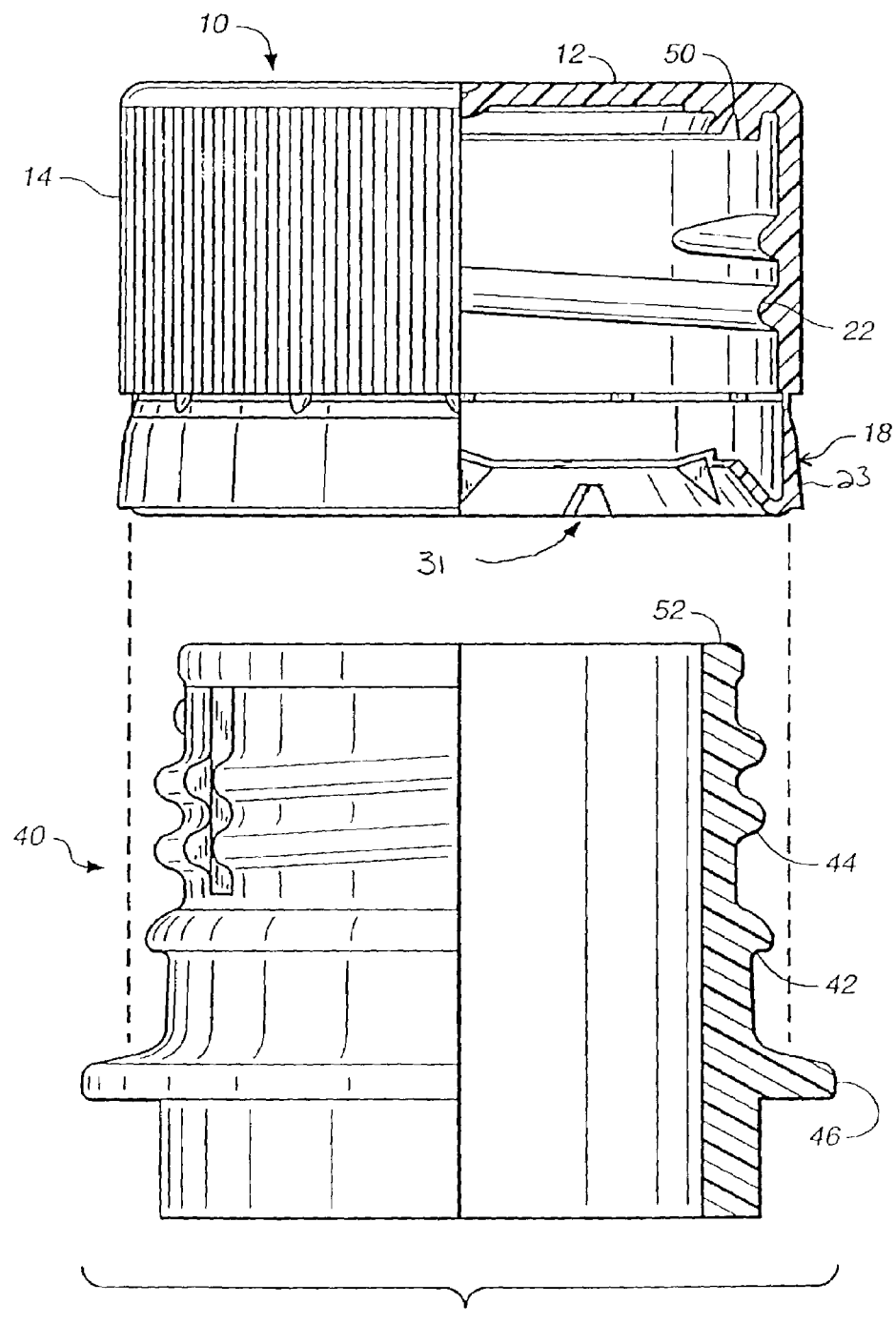
FIG._8

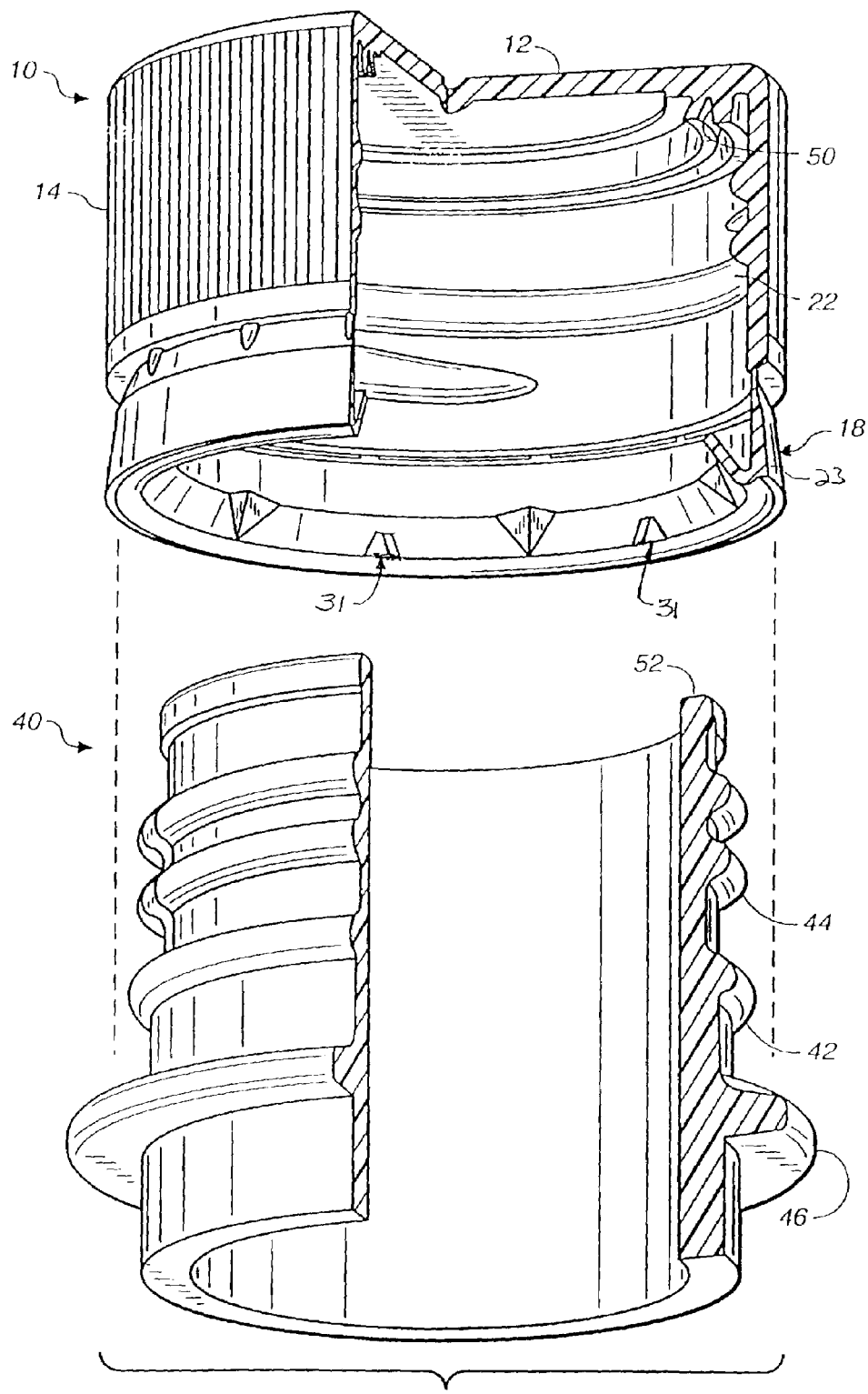
FIG._9

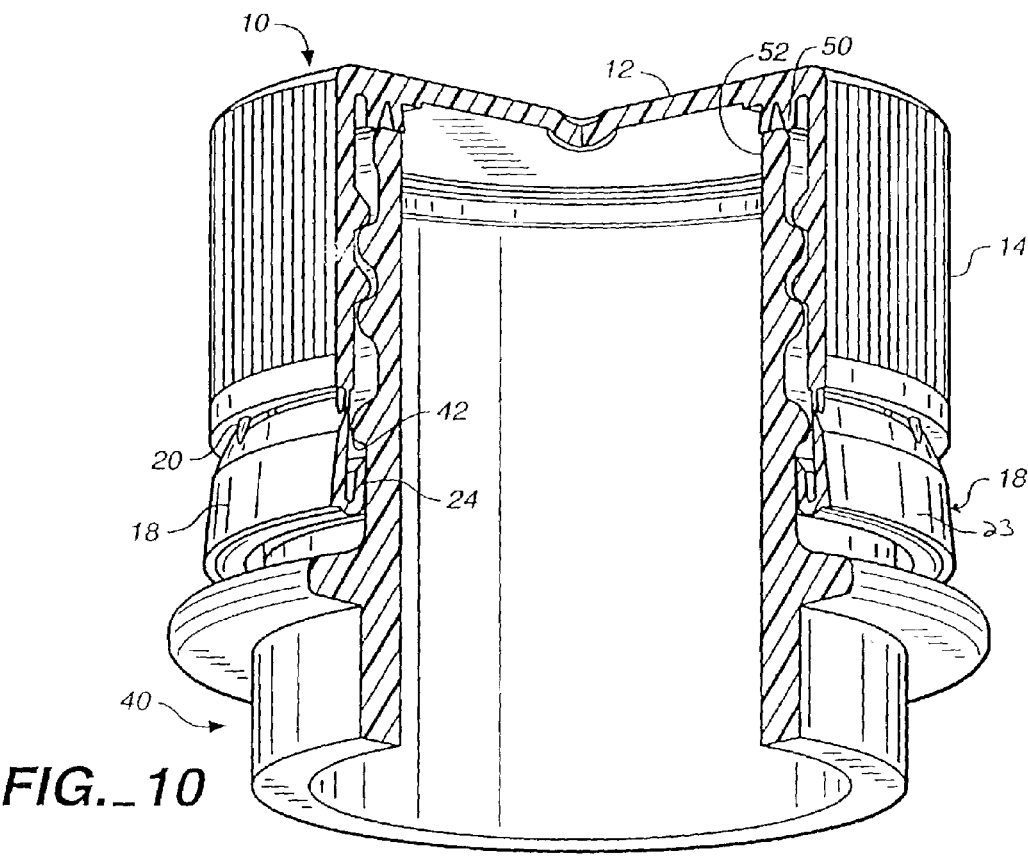
FIG._10
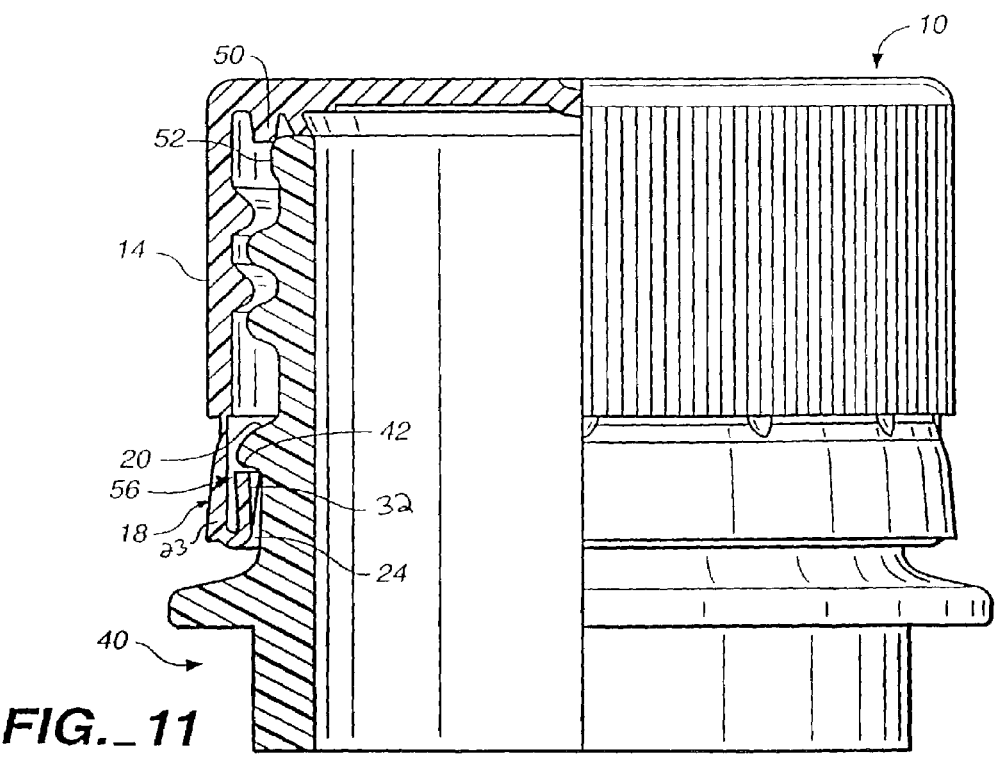
FIG._11

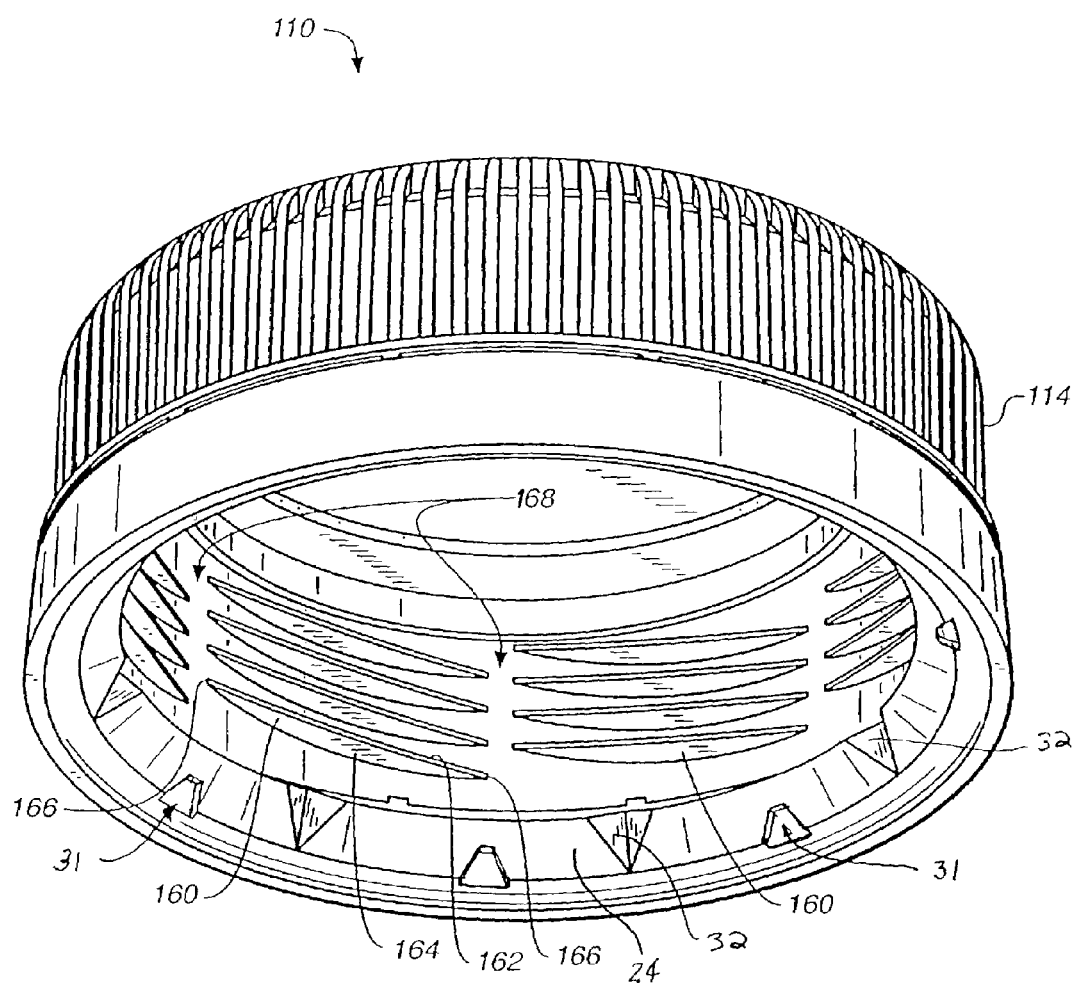
FIG._12

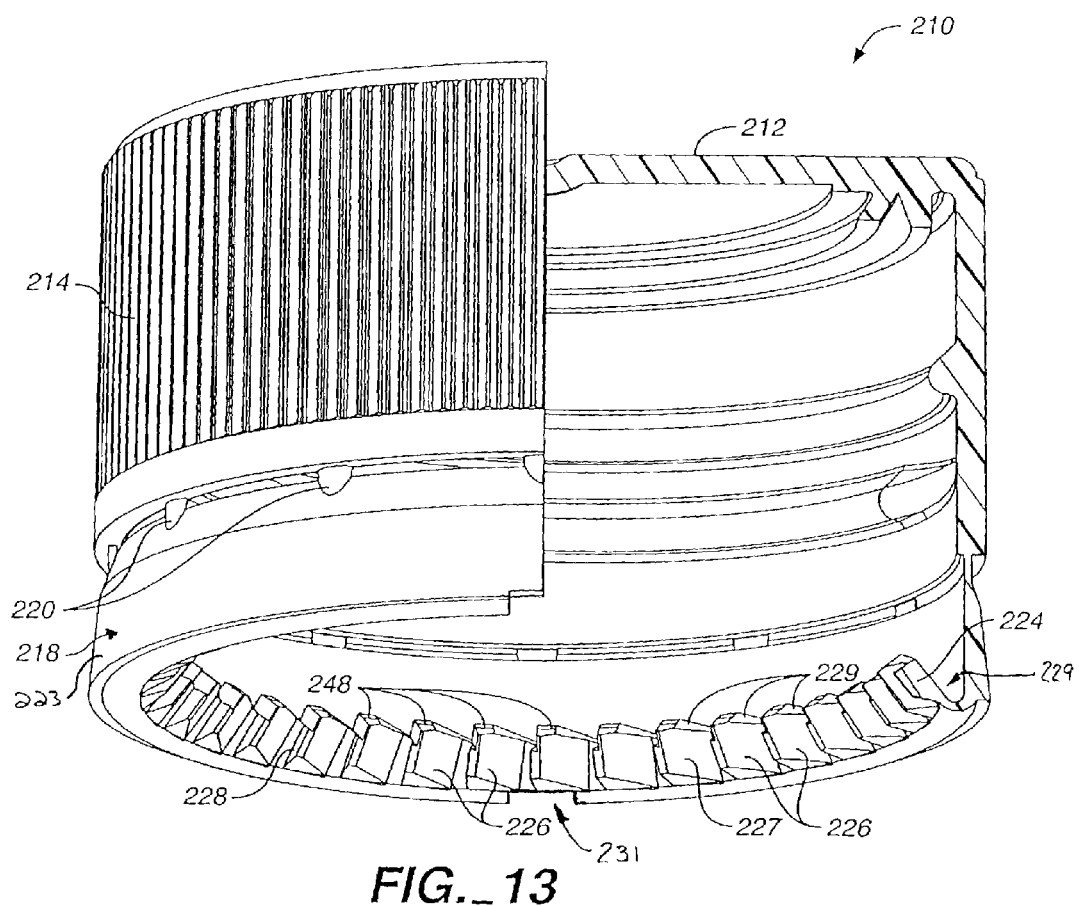
FIG._13

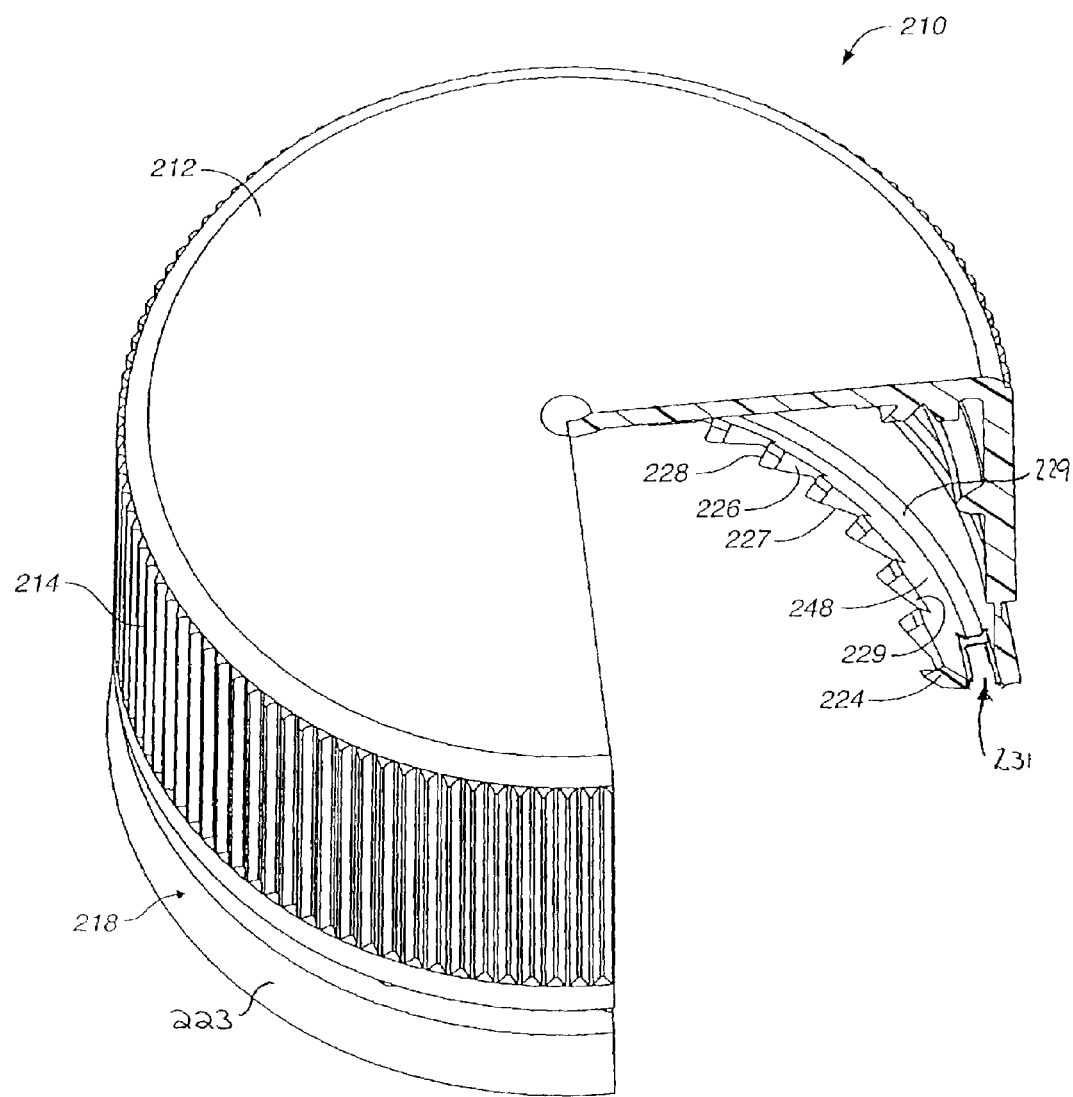
FIG._14

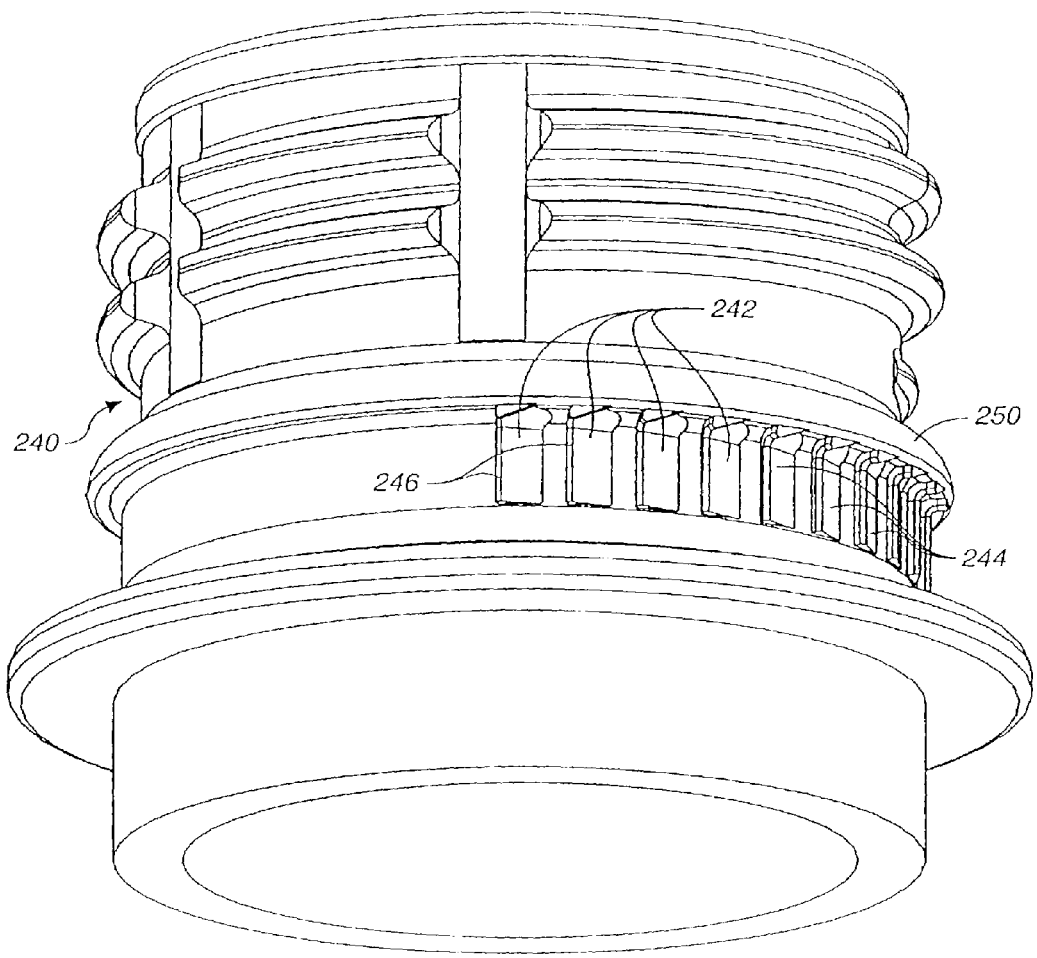
FIG._15

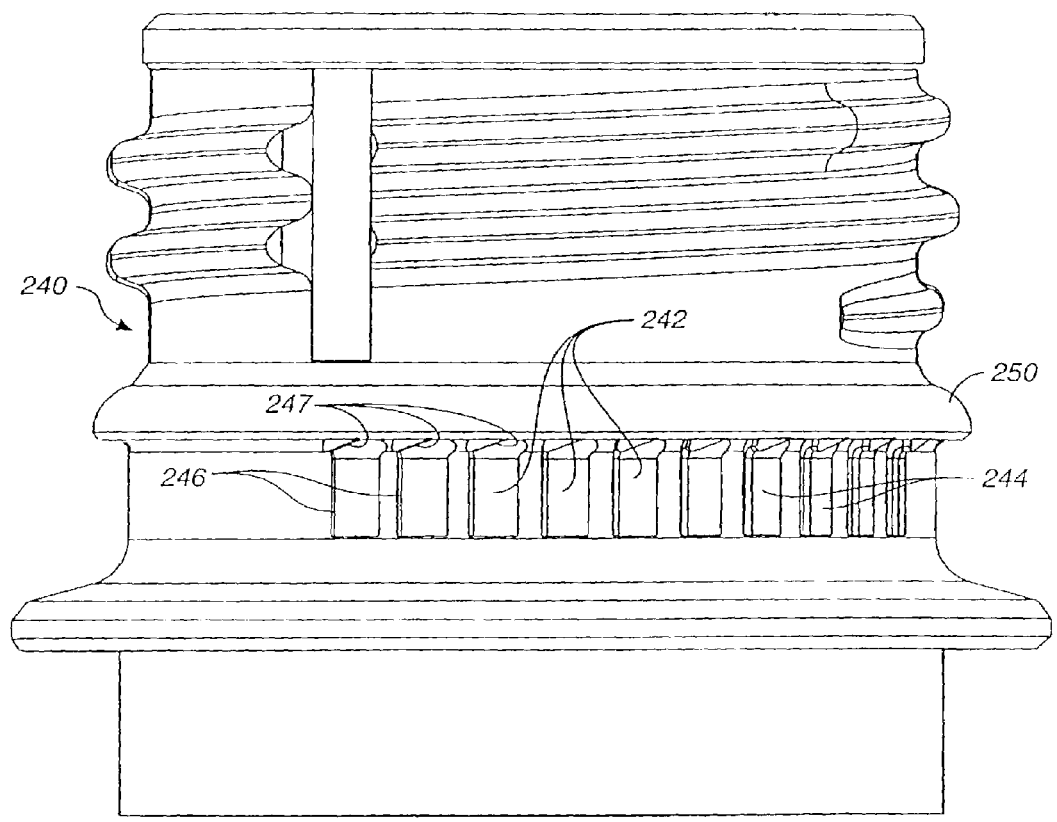
FIG._16

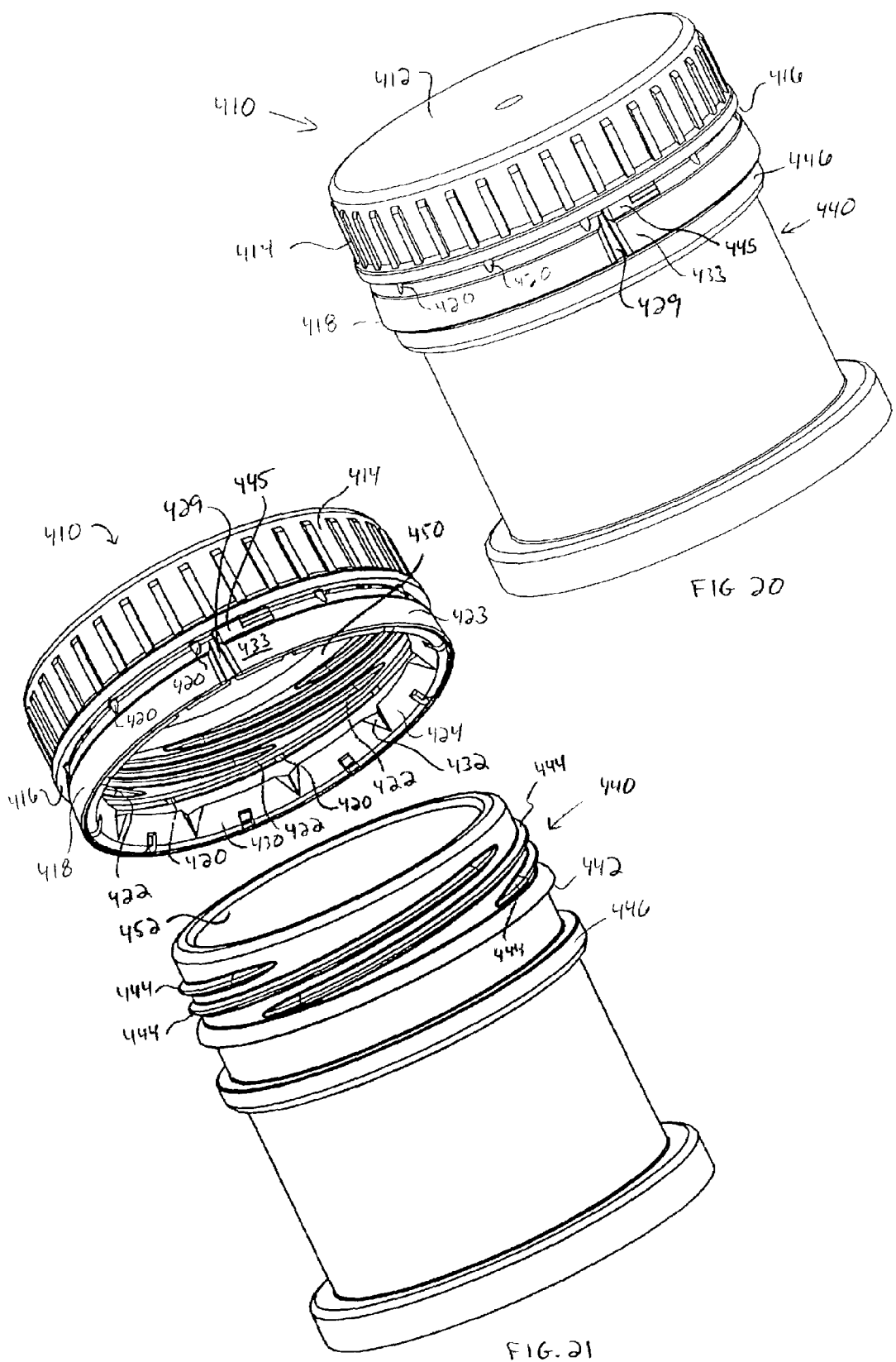

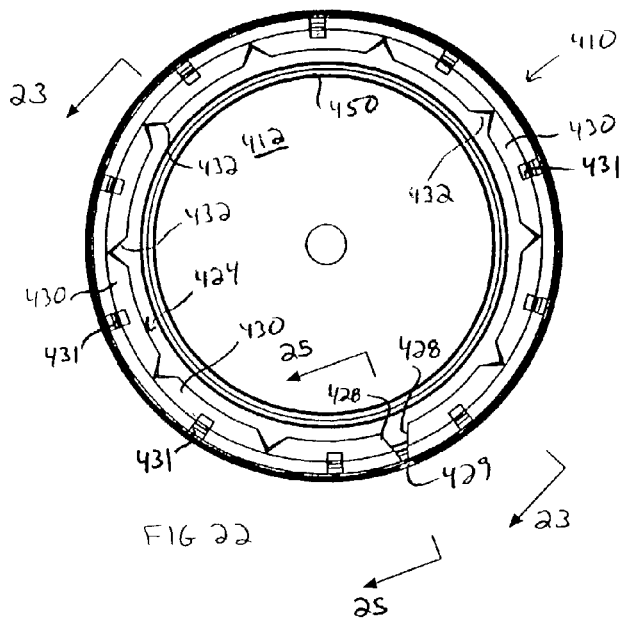
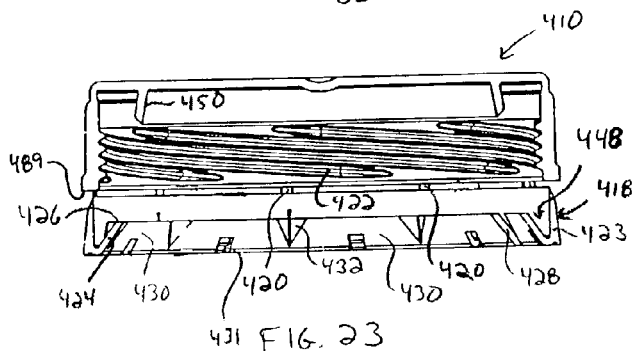
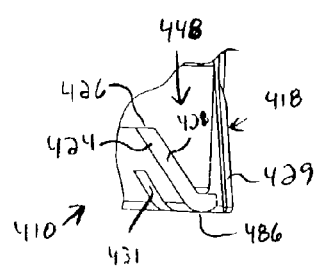
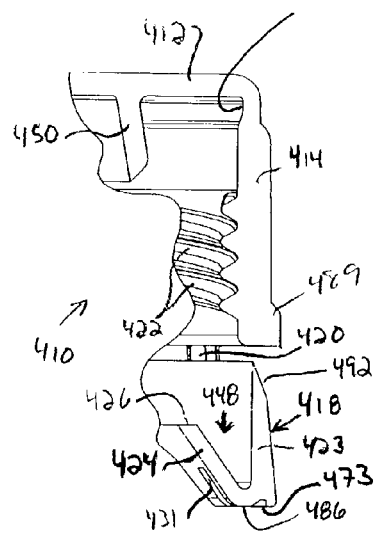
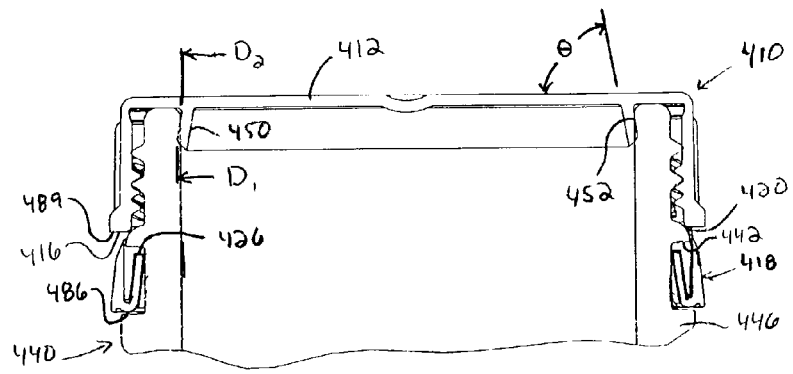

TAMPER EVIDENT BOTTLE CAP

CROSS-REFERENCES TO RELATED APPLICATIONS

This application is a Continuation-in-Part of U.S. patent application Ser. No. 09/955,844 filed Sep. 18, 2001 now U.S. Pat. No. 6,766,916, which is a Continuation-in-Part of U.S. patent application Ser. No. 09/900,505 filed Jul. 5, 2001 now U.S. Pat. No. 6,484,896, which is a Continuation-in-Part of U.S. patent application Ser. No. 09/653,679 filed Sep. 1, 2000 and now abandoned, which is a Continuation of U.S. patent application Ser. No. 09/323,571, filed Jun. 1, 1999 and now U.S. Pat. No. 6,112,923, which is a Continuation-in-Part of U.S. patent application Ser. No. 08/904,878, filed Aug. 1, 1997 and now U.S. Pat. No. 5,913,437. The entire contents of the above applications are incorporated herein by this reference.

BACKGROUND OF THE INVENTION

1. Field of the Invention

The present invention relates to improvements in tamper-evidencing closures including tamper-evidencing bands such as those commonly used as bottle caps.

2. Description of Related Art

U.S. Pat. No. 4,801,031 to Barriac discloses a tamper-indicating closure that includes an inwardly folded tamper-indicating band with intermittent pleats, around the inwardly folded portion of the band. The pleats are inwardly directed and spaced around the circumference of the band. U.S. Pat. No. 5,400,913 to Kelly discloses a similar tamper-indicating closure that also has an inwardly folded tamper-indicating band with continuous pleats around the inwardly folded portion of the band.

As discussed in the Kelly '913 patent, the tamper-indicating band should slip over the locking bead or rim of the container neck without damaging the frangible connection between the band and the skirt of the closure. The tamper-indicating band must be sufficiently elastic in order to avoid too great a resistance when closing the bottle, which could damage the frangible connection. However, the tamper-indicating band should be sufficiently stiff in order to reliably engage the locking bead of the container neck and thereby hold the band beneath the locking bead when opening the closure, so that the tamper-indicating band will sever the frangible connection.

The Kelly '913 patent improves the flexibility of the inwardly folded pleated portion of the band in two ways. One, a frangible connection is provided between each pleat. The frangible connections between the pleats ensure high elasticity of the tamper-indicating band during closure. Alternatively, individual bridges, instead of a frangible connection, are provided between the pleats. The bridges are relatively easily damaged during opening of the closure, thus improving the tamper-indicating nature of the closure.

It has been determined by the applicant herein that the inwardly-turned pleated designs of both the Barriac '031 patent and the Kelly '913 patent have a tendency to improperly grip the locking bead of the container neck and, thereby allow the tamper-indicating band to slip back upwardly over the locking bead upon opening of the closure, which defeats the tamper-indicating aspect of the designs. The present invention improves upon this aspect of prior art pleated tamper-indicating bands.

It is also known for the internal thread pattern of a bottle cap to include spaced gaps around the spiral thread bead for the purpose of reducing weight of the bottle cap as well as to simplify tooling production required to manufacture the bottle caps. The present invention also provides an improved spiral thread pattern and design.

A further problem encountered with tamper-evidence closures is that the tamper-indicating band and inwardly turned retaining rim can trap liquid in the closure. Thus, product used to fill the container can spill on the container neck and when the container is closed by the closure or cap, the liquid product trapped by the inwardly turned retaining rim. Similarly, in many instances the container will be washed after capping, and the wash water can become trapped in the cap. In either case, and particularly for products which contain sugar, the trapped liquid can act as a habitat for the growth of bacteria, mold and the like.

A further problem encountered with tamper-evidence closures is that the plug of the tamper-indicating closure may not sufficiently seal against the closure in the event that the closure is applied such that it is cross-threaded with respect to the container. Additionally, the application forces necessary to apply prior closures often is not constant and may fluctuate increasing the likelihood that the closure will cross-thread as it is applied to the container. Additionally, upwardly and inwardly turned retaining rims of prior tamper-evidencing bands often remain on the container neck as the closure is removed from the container thus requiring the removal of the band prior to washing the container for recycling purposes. Furthermore, prior methods of forming tamper-evidencing closures having an inwardly and upwardly directed retaining rims were subject to the possibility of the molded closure from failing to demold entirely from prior molding apparatus thus requiring additional steps to remove the closure from the molding apparatus.

BRIEF SUMMARY OF THE INVENTION

Briefly described, the present invention comprises a tamper-evidencing closure for a container with a locking surface on the neck of the container, with the closure including a closure or cap with a top portion and a depending annular skirt, a tamper-evidencing band connected to the lower edge of the annular skirt by means of a frangible connection, the tamper-evidencing band including an inwardly turned retaining rim that extends at least partially upwardly relative to the container neck, the retaining rim including a free edge that is adapted to engage the locking surface of the container neck. Optionally, the retaining rim includes ramp elements that provide for one-way screwing of the closure cap onto a neck having corresponding ramp elements.

One aspect of the present invention is directed to a container including a neck and an opening, in combination with a tamper-evidencing closure including atop, a depending annular skirt and a tamper-evidencing band frangibly connected to the annular skirt. The container includes a locking surface on the neck spaced from the opening. The tamper-evidencing band includes an inwardly turned retaining rim that extends at least partially upwardly. The retaining rim has a free edge having a locking surface engaging structure formed for engagement with the locking surface as the closure is removed from the neck to ensure breakage of the frangible connection. The locking surface engaging structure can include a plurality of outwardly directed pleats spaced circumferentially thereon and a second securing structure located on the retaining rim between the pleats.

In another aspect of the present invention the inwardly turned retaining rim with the locking surface engaging structure is further formed with at least one, and preferably a plurality, of passageways therethrough which allow for the drainage and/or evaporation of liquid trapped by the closure. The provision of one passageway between each pair of circumferentially adjacent locking surface engaging pleats is particularly advantageous.

Another aspect of the present invention is directed to a closure for sealing the opening of a container having a threaded neck. The closure includes a top having an underside, a downwardly depending annular skirt, a thread configuration on an inner surface of the skirt, and a plug extending downwardly and outwardly from the underside of the top, the plug including an upper end joined to the underside and having a first outer diameter, the plug further including a lower end spaced from the upper portion and having a second outer diameter larger than the first outer diameter.

Preferably, the lower end includes a maximum outer diameter forming a sealing surface adapted to seal the container opening. Preferably, the annular skirt includes a lower skirt wall portion having a first inner diameter and an upper skirt wall portion proximal the top having a second inner diameter larger than the first inner diameter.

Another aspect of the present invention is directed to a combination including a container having a neck forming an opening and a closure for sealing the opening. The closure includes a downwardly depending skirt, an external thread configuration on an outer surface of the neck. An internal thread configuration on an inner surface of the skirt is shaped to mate with the external thread configuration on the neck. The external and internal thread configurations are adapted to pass over each other upon downward movement of the closure skirt relative to the container neck, wherein one of the external and internal thread configurations have at least one thread lead and the other of the external and internal thread configurations have at least twice as many thread leads as the one thread configuration.

Yet another aspect of the present invention is directed to a tamper-evidencing closure for sealing a container. The closure includes a top, a depending annular skirt and a tamper-evidencing band frangibly connected to the annular skirt. The tamper-evidencing band includes an inwardly turned retaining rim that extends at least partially upwardly. The retaining rim has a free edge adapted for engagement with a locking surface of the container. The tamper-evidencing band also includes an attachment boss and an upwardly extending line of weakness adjacent the attachment boss such that when the closure is removed from the container, the line of weakness tears allowing the tamper-evidencing band to be removed from the closure such that the band remains attached to the closure upon removal from the container by the attachment boss.

Preferably, the retaining rim includes a gap therein aligned with the line of weakness. The tamper-evidencing band may include a tapered annular band wall having an upper portion and a lower portion, the upper portion being thinner than the lower portion. In one embodiment, the upper portion forms a sharp corner for facilitating demolding of the closure during manufacture thereof. Preferably, the lower portion forms an engagement shoulder for facilitating demolding of the closure during manufacture thereof.

Another aspect of the present invention is directed to a method of molding a closure with a tamper-evidencing band having an upwardly and inwardly extending retaining rim. The method includes closing a mold assembly having a cavity, a core, a core sleeve, and a splitter to define a mold cavity forming the shape of the closure, withdrawing the cavity away from the core, core sleeve and splitter, staging the core and stripper away from the core sleeve to advance the closure away from the core sleeve, stopping the core allowing the stripper and the closure to move away from the core, retracting the core stripper to draw the closure toward the core and abut against the core such that the core stops movement of the closure, and continuing retraction of the core such that the closure is disengaged from the stripper as the closure abuts against the core.

Preferably, the retaining rim of the cap flexes thereby allowing the retaining rim to disengage from the core and move past the core as the core is stopped. The closure may include a plug having an angled outer surface and the plug flexes thereby allowing the plug to disengage from the core and move away from the core as the core is stopped. In one embodiment, an outer surface of the core forms a space between the retaining rim and an outer wall of the tamper-evidencing band.

Another aspect of the present invention is directed to a closure for sealing the opening of a container having a radially extending locking bead. The closure includes a top having a periphery, an annular skirt depending downwardly from the periphery and including a lower edge and a line of weakness extending upwardly from the lower edge, a tear tab extending downwardly from the skirt below the lower edge, and a tamper-evidencing locking member including an inwardly extending locking ring that extends radially inwardly from the skirt intermediate the top and the bottom edge, the retaining rim including a free edge that is adapted to engage the radially extending locking bead of the container when the closure is removed from the container neck.

Preferably, the line of weakness is a scoreline extending vertically from the lower edge.

Preferably, the locking ring includes an outwardly directed pleat.

Preferably, the locking ring includes a plurality of outwardly directed pleats.

In one embodiment, the locking ring extends radially inwardly and axially upwardly so that the free edge of the locking ring prevents upward movement of the locking ring with respect to the container.

The accompanying drawings, which are incorporated in and form a part of this specification, illustrate embodiments of the invention and, together with the description, serve to explain the principles of the invention.

BRIEF DESCRIPTION OF THE DRAWINGS

FIG. 1 is a perspective view of a tamper-evidencing closure in accordance with the present invention.

FIG. 2 is a side elevational view of the tamper-evidencing closure shown in FIG 1.

FIG. 3 is a bottom plan view of the tamper-evidencing closure of FIG. 2.

FIG. 4 is a sectional view, taken along the line 4—4 of FIG. 3.

FIG. 5 is an enlarged, detail view of the retaining rim of the tamper-evidencing closure of FIG. 4.

FIG. 6 is a sectional view, taken along the line 6—6 of FIG. 3.

FIG. 7 is an enlarged, detail view of the retaining rim of the tamper-evidencing closure of FIG. 6.

FIG. 8 is an exploded view of the bottle cap of FIG. 1 and a container neck, with the tamper-evidencing closure and container neck shown in quarter section.

FIG. 9 is an exploded perspective view of the tamper-evidencing closure and container neck of FIG. 8.

FIG. 10 is a quarter-section perspective view of the tamper-evidencing closure mounted onto the container neck.

FIG. 11 is a side elevational view, shown in partial section, of the tamper-evidencing closure mounted onto the container neck.

FIG. 12 is a perspective view of another embodiment of the internal thread pattern of the tamper-evidencing closure of FIG. 1.

FIG. 13 is a perspective view from underneath of another embodiment of the improved tamper-evidencing closure of the present invention, shown with a quarter section cut away.

FIG. 14 is a perspective view from above of the tamper-evidencing closure of FIG. 13.

FIG. 15 is a perspective view of an improved container neck design for screwing the closure of FIG. 13 thereon.

FIG. 16 is a side elevational view of the container neck of FIG. 15.

FIG. 20 is a perspective view of another tamper-evidencing closure and container neck in accordance with the present invention.

FIG. 21 is an exploded perspective view of the tamper-evidencing closure and container neck of FIG. 20.

FIG. 22 is a bottom plan view of the tamper-evidencing closure of FIG. 20.

FIG. 23 is a cross-sectional side view of the tamper evidencing closure of FIG. 20 taken along line 23—23 of FIG. 22.

FIG. 24 is an enlarged, cross-sectional detailed view of the tamper-evidencing closure of FIG. 20.

FIG. 25 is an enlarged, cross-sectional view of the tamper-evidencing closure of FIG. 20 taken along line 25—25 of FIG. 22.

FIG. 26 is a schematic side view showing the tamper-evidencing closure of FIG. 20 mounted on the container neck of FIG. 20.

DETAILED DESCRIPTION OF THE INVENTION

Figure 17:
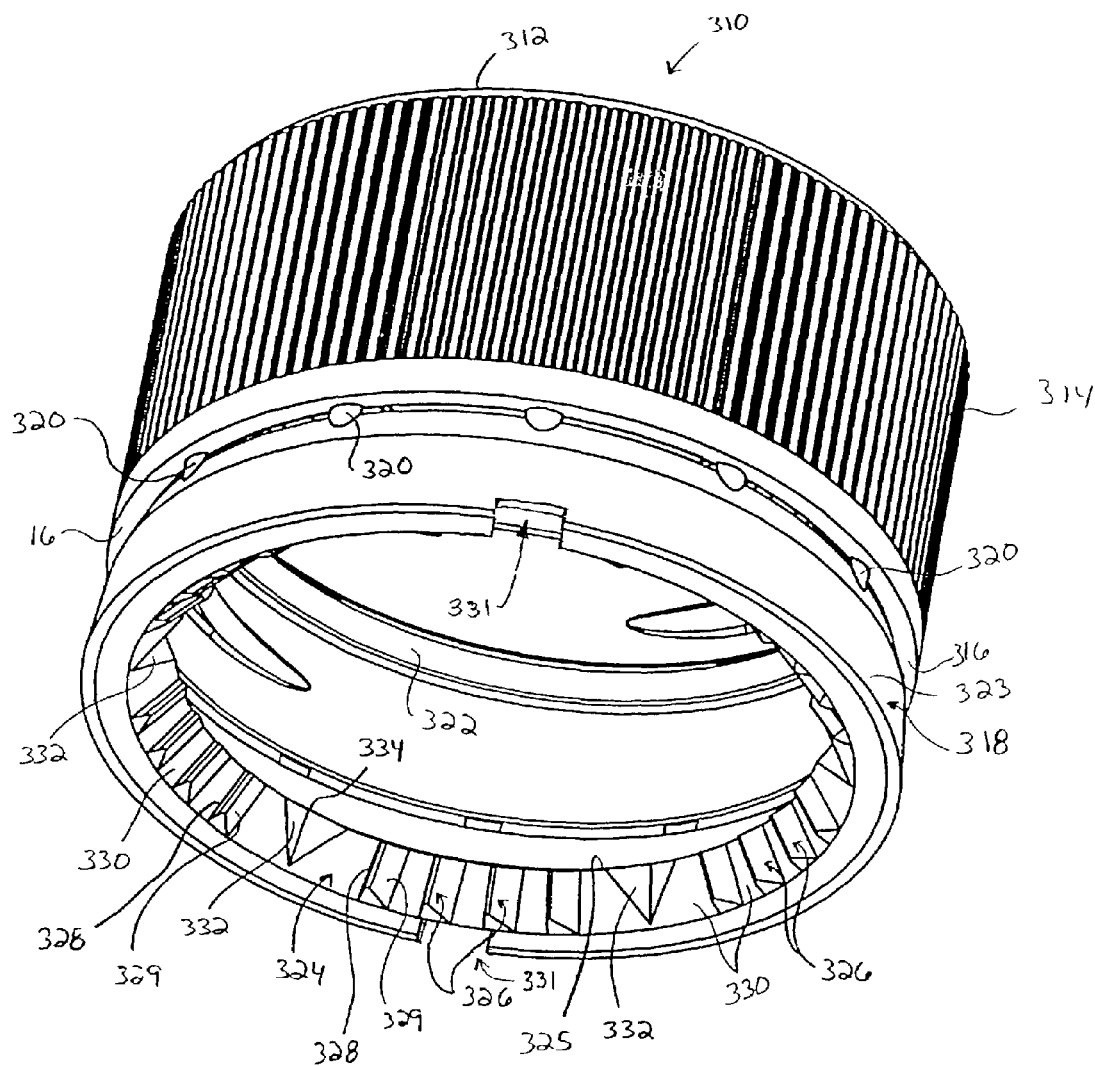
FIG. 17 is a perspective view, similar to FIG. 1, of another embodiment of the improved tamper-evidencing closure of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Referring to FIG. 1, a tamper-evidencing closure in the form of a bottle cap 10 forms a closure for capping off a spout or container neck of a bottle (not shown). Bottle cap 10 includes a round top portion 12 and a depending annular or cylindrical skirt 14. Skirt 14 includes a lower edge 16, to which a tamper-evidencing band 18 connects by means of a frangible connection in the form of thin-walled, breakable connections 20. The internal side wall of skirt 14 includes a conventional spiral thread bead 22. One aspect of novelty of the embodiment of the present invention shown in FIG. 1 resides in the design of tamper-evidencing band 18 and, accordingly, the design of top portion 12 and depending annular skirt 14 by themselves form no part of the present invention.

Tamper-evidencing band 18 includes an annular outer wall 23 and an inwardly and upwardly turned, annular retaining rim 24 extending from annular outer wall 23. Retaining rim 24 includes an upper free edge 26. Free edge 26 includes a locking surface engaging structure which cooperates with a an annular bead or rim, such as bead 42 in FIGS. 8 and 9, on the bottle neck. The locking surface engaging structure produces breakage of the frangible connection of the cap, in a manner described below, and may include pleats 32, which are pleated radially outwardly, and arcuate portions 30 therebetween.

Referring to FIGS. 2 and 3, bottle cap 10 includes a series of frangible connections 20 that are formed by thin wall segments which have sufficient compressive rigidity to withstand the compressive forces imposed by tamper-evidencing band 24 as the bottle cap is mounted onto a container spout, yet also has minimal tensile strength so that frangible connections 20 break when the bottle cap is threaded back off of the container spout.

A series of six pleats 32 are formed in the upwardly and inwardly turned retaining rim 24. While the present invention is not meant to be limited to a particular number of pleats, it is desirable to provide at least two pleats and preferably at least four. In the embodiment shown, the pleats are formed as pleats, six in number. However, other pleat designs can be used so long as the design allows the upper edge of the rim to expand. Provision of six pleats, of course, creates six arcuate portions 30 along free edge 26. Arcuate portions 30 have a radius of curvature that approximates the curvature of the container spout so that when the bottle cap is mounted onto the container neck, upper edge 26 of the arcuate portions firmly grips a locking surface on the container neck.

Pleats 32 are pleated radially outwardly of arcuate portions 30. In other words, pleats 32 fold outwardly of arcuate portions 30 toward outer annular wall 23. Pleats 32 include a vertex 34 that is spaced a short distance inwardly of skirt 14. Preferably, the depth of pleats 32 is such that outer extremity 34, i.e. the vertex, of each pleat remains underneath the locking surface of the container neck. This is discussed in more detail with reference to FIG. 11.

Referring to FIGS. 4–7, inwardly turned retaining rim 24 extends at least partially upwardly so that its upper free edge 26 faces upwardly and is positioned to engage the locking surface of the container neck. It can also be seen in these figures that pleats 32 extend radially outwardly from arcuate portions 30. It is known to provide inwardly projecting pleats, such as those found on the bottle caps disclosed in the prior mentioned Kelly '913 patent and the Barriac '031 patent. Inwardly projecting pleats result in less upper free edge contact with the locking surface of the container neck, which can result in the retaining rim slipping over the locking surface without the frangible connections breaking when the bottle cap is initially unscrewed off of the container neck.

The thin wall construction of frangible connections 20 allows for relatively easy breakage of the frangible material when free edge 26 of retaining rim 24 engages the locking surface of the container neck. Yet, frangible connections 20 have sufficient compressive strength to withstand the initial compressive forces of tamper-evidencing band 18 when the bottle cap is first threaded onto the container neck.

FIGS. 8 and 9 illustrate a design for a conventional bottle neck 40. The design of bottle neck 40 forms no part of the present invention aside from the fact that bottle neck 40 requires some type of locking surface 42, such as an annular bead, rim or the like. The rest of the features of bottle neck 40 are conventional in design, including thread 44 and annular base flange 46. The retaining rim of the bottle cap locks underneath locking surface 42.

Also shown in FIGS. 8 and 9 is an internal annular groove 50, which mates with upper rim 52 of bottle neck 40. This creates a leak-proof seal around the opening of bottle neck 40.

FIGS. 10 and 11 show bottle cap 10 threadably mounted onto bottle neck 40. Retaining rim 24 is bent and flexed outwardly to expand its diameter to match the diameter of bottle neck 40. The upper edge of retaining rim 24, including the upper edge of pleats 32, is in close proximity to locking surface 42. It can be seen in FIG. 11 that there is a small gap 56 between pleat 32 and the inside wall of tamper-evidencing band 18.

When bottle cap 10 is unscrewed off of bottle neck 40, retaining rim 24 engages locking surface 42. Due to the position of frangible connections 20 on the outside of locking surface 42, a slight torque is placed on the retaining rim, which may tend to cause retaining rim 24 to move outwardly toward annular wall 23. If this happens, pleats 32 engage band 18 and prevent the upper free edge of the retaining rim from moving outwardly from underneath the locking surface, which would allow the tamper-evidencing band to slip over the locking surface without breaking the frangible connections.

Another advantage of the design of the tamper-evidencing band of the present invention is that it is more difficult to "tamper" with the band. Theoretically, it is possible to pry the tamper-evidencing band out beyond the locking surface, with the use of a flat edge tool such as a standard screw driver. With prior art designs, only the inwardly directed pleats needed to be pried out over the locking surface. With the present design, because the retaining rim includes arcuate portions that engage the locking surface across at least a majority of the upper free edge surface of the retaining rim, it is more difficult to pry outwardly enough of the retaining rim to slip the tamper-evidencing band out over the locking surface.

While the improved locking surface engaging structure of the present invention enhances detection of tampering with the product, the inwardly turned rim 24 also provides a structure which can trap liquid between the cap and the bottle. Thus, either product, or wash water, or both, can collect in the U-shaped annular volume or space 29 between annular wall 23 and rim 24, as can be seen, for example, in FIGS. 6 and 7. Passageways 31 formed in rim 24 at the bottom or inward bend of the rim will permit any liquids in space 29 to drain out of the cap or at least evaporate more readily so that they do not provide a habitat for mold and bacteria growth.

Most preferably, a passageway 31 is provided between each circumferentially adjacent pair of pleats 32 since pleats 32 tend to act as circumferential barriers to the migration of liquid past the pleats.

FIG. 12 illustrates the design for an alternative embodiment for the internal thread pattern of bottle cap 110. It can be seen that the thread pattern is formed by a series of thread segments 160. Each thread segment 160 is shaped like a chord segment with a straight inner edge 162 that creates a wider depth at its center 164 and progressively becomes shallower out to its ends 166, where it becomes flush with the inner surface of skirt 114.

Thread segments 160 are vertically aligned with the segments above and below in a manner that creates gaps 168. In addition, thread segments 160 are aligned along a spiral path with the segments at either side, so as to create an intermittently defined thread channel for the thread of a container neck. As also will be seen drainage passageways 31 can be provided between each circumferentially adjacent pair of pleats 32 around the circumference of rim 24.

An advantage of the thread design shown in FIG. 12 is not only that it creates a much more light weight bottle cap, it is also much easier to manufacture from a tooling standpoint. Molds for injection molding bottle caps like those discussed herein can more easily be fabricated for producing thread segments as shown.

FIGS. 13 and 14 show another alternative embodiment for the tamper-evidencing band of the present invention. Cap 210 is similar to cap 10 of FIG. 1, except that tamper-evidencing band 218 has been modified. Cap 210 includes a top 212 and a skirt 214 and breakable connections 220 still connect skirt 214 to band 218. Tamper band 218 includes an annular wall 223 and an inwardly and upwardly turned, annular retaining rim 224 extending from annular wall 223. In this embodiment, retaining rim 224 includes wedge or ramp elements 226 that form part of a ratchet mechanism for securing the tamper band. Ramp elements 226 each include a ramp surface 227 and a blunt radial side 228. Ramp elements 226 also include an upper ramp surface 229 that also forms part of a one-way ratchet mechanism for screwing on cap 210, as discussed herein.

FIGS. 15 and 16 show neck 240 of a bottle that has similarly been modified to include a series of annularly spaced ramp elements 242, which also form part of the ratchet mechanism. Neck ramp elements 242 do not extend all the way around the neck, which is not believed to be necessary in order to restrain the cap, and in fact simplifies the manufacturing process for the neck. However, the ramp elements could extend annularly all around the neck if required. Each ramp element 242 includes an outwardly facing ramp surface 244, and a blunt side edge 246, similar to the ramp elements of the cap. Neck ramp elements 242 also include downwardly facing ramps 247 that extend radially outwardly, but not beyond the edge of a neck retaining rim or locking rim 250. Ramp surfaces 244, 247 and side edges 246 work in conjunction with ramp elements 226 of cap 210 to permit threading of cap 210 onto neck 240, as the respective ramp surfaces engage one another, and the blunt edges slide past one another.

Once threaded onto neck 240, upper edges 248 of ramp elements 226 engage neck locking rim 250 of neck 240, thereby preventing upward release of the cap. Also, once threaded on, blunt sides 228 of ramp elements 226 engage blunt sides 246 of ramp elements 242, which prevents unthreading of tamper-evidencing band 218. Ramp surfaces 244 and 227, and 229, 247 allow for easier mounting of the cap fully onto the neck.

In operation, cap 210 is threaded onto neck 240 until ramp elements 226 pop beneath neck locking rim 250. Then, to unscrew cap 210, skirt portion 214 is counter-rotated against the retention forces provided by the ratchet engagement of the ramp elements, which prevent unthreading of the tamper-evidencing band. Once the counter-rotational forces are great enough, breakable connections 220 fracture, thereby releasing cap 210 to continue unscrewing from the neck.

The ratchet design of retaining rim 218 and neck 240 provides a design for easy breaking of connections 220 and in addition provides sufficient surface area on the tops of ramp elements 226 to retain band 218 beneath locking rim 250. One should appreciate that inwardly directed pleats could be provided in combination with ramp elements in order to prevent outward flexing of retaining rim 224.

An advantage of the ratchet mechanism of the present invention is that it significantly improves the tamper-evident feature of the bottle cap. With prior art tamper-evident bands, it is possible to rotate the cap a certain amount before the breakable connections separated, which can break the seal lock of the cap without breaking off the connections. Thus, it is possible to rupture the seal lock without breaking the breakable connections, which creates the appearance of a proper seal when in fact the seal may have been broken. The present invention prevents any rotation of the tamper band. As such, the breakable connections will separate before the seal is broken, which is the desired result for providing evidence or an indication of tampering.

As was the case for the previously described embodiments, passageways 231 can be provided in annular rim 224 so the liquids are not trapped in U-shaped annular space 229 of rim 224. In the illustrated embodiment, two passageways 231 are provided for liquid drainage. One should appreciate, however, that one or more passageways can be utilized in accordance with the present invention.

Figure 19:
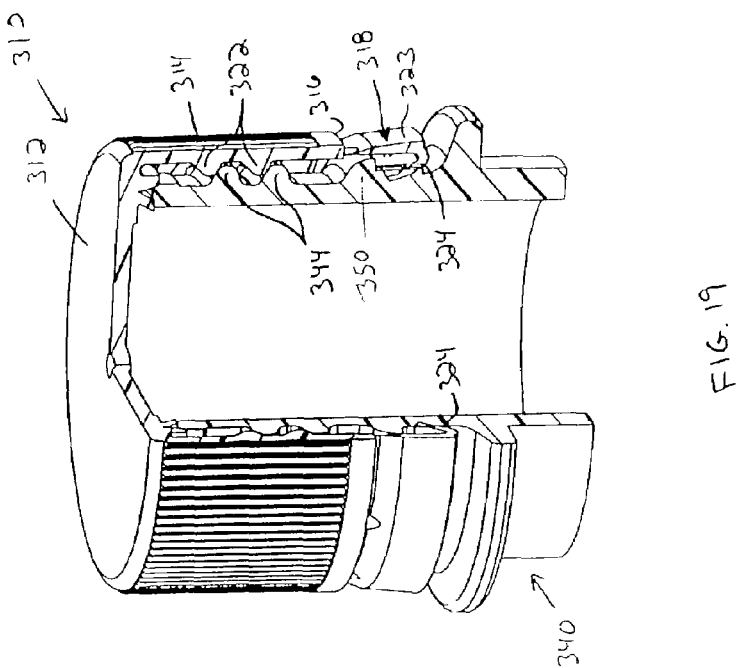
FIG. 19 is a quarter section perspective view of the tamper-evidencing closure of FIG. 18 mounted onto the container neck.
Figure 18:
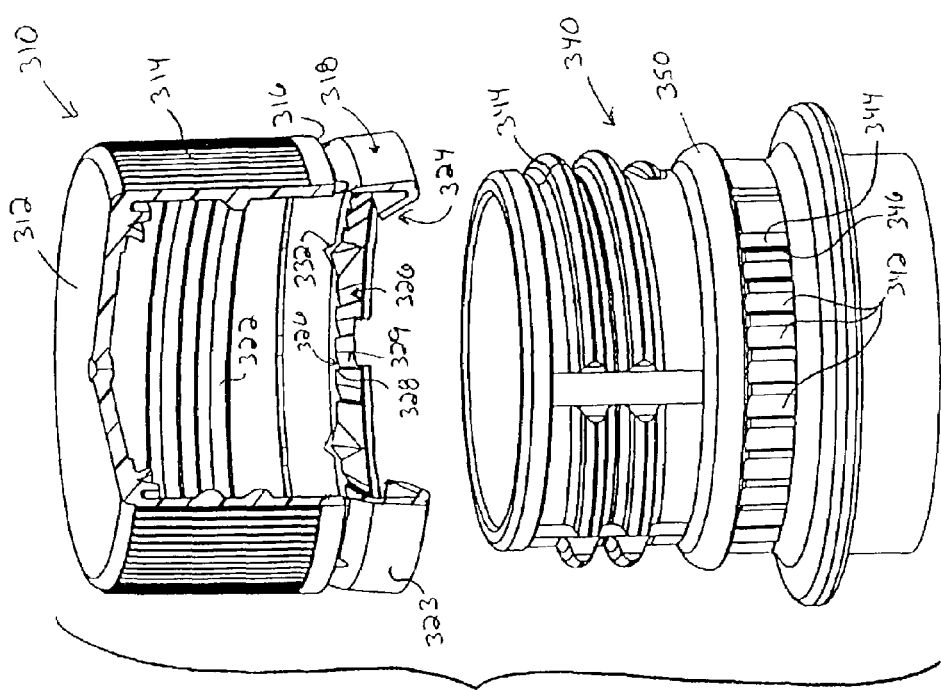
FIG. 18 is an exploded perspective view of the bottle cap of FIG. 17 and a container neck, with the tamper-evidencing closure shown in quarter section.

In the embodiment shown in FIGS. 17-19, a cap 310 is similar to cap 10 of FIG. 1 and to cap 210 of FIG. 13 but having a modified tamper-evidencing band 318. Cap 310 includes a round top portion 312 and a depending annular or cylindrical skirt 314. Breakable connections 320 connect a lower edge 316 of skirt 314 to a tamper-evidencing band 318 in the same manner discussed above. Tamper band 318 includes an outer annular wall 323 and an inwardly and upwardly turned, annular retaining rim 324 extending from annular outer wall 323. In this embodiment, retaining rim 324 includes an upper free edge 325. Free edge 325 includes pleats 332 which are pleated outwardly. Free edge 325 also includes arcuate portions 330 between pleats 332. The pleats function in the same manner discussed above.

As shown in FIG. 17, the locking surface engaging structure of retaining rim 324, which ensures breakage of connections 320, also includes wedge or ramp elements 326 that form part of a ratchet mechanism for securing the tamper band. One should appreciate that one, two, three or more ramp elements can be utilized in accordance with the present invention. Cap ramp elements 326 each include a cap ramp surface 329 and a cap blunt radial side 328 which form part of a one-way ratchet mechanism for screwing on cap 310 and/or tamper-evidencing means for cap 310 as discussed herein. The ratchet mechanism functions in a same manner as discussed above.

FIGS. 18 and 19 show a neck 340 of a bottle that has been similarly modified to includes a series of annularly spaced neck ramp elements 342 along a neck retaining rim or locking rim 350. Neck ramp elements 342 do not extend all the way around neck 340. One should appreciate, however, the ramp elements could extend annularly all around the neck in accordance with the present invention. Each ramp element 342 includes an outwardly facing ramp surface 344, and a blunt side edge 346, similar to the ramp elements of cap 310. Ramp surfaces 344 and blunt side edges 346 work in conjunction with ramp elements 326 of cap 310 to permit threading of cap 310 onto neck 340, as the respective ramp surfaces engage one another, and the respective blunt edges slide past one another.

Once threaded onto neck 340, cap blunt side edges 328 of cap ramp elements 326 engage neck blunt side edges 346 of neck ramp elements 342 located on neck locking rim 350, thereby preventing undesired loosening of cap 310 with respect to neck 340 and the undesired upward release of the cap. In particular, blunt sides 328 of cap ramp elements 326 engage neck blunt sides 346 of ramp elements 342, thus preventing undesired unthreading of tamper-evidencing band 318. Ramp surfaces 344 and 329 allow for easier mounting of the cap fully onto the neck.

In operation, cap 310 is threaded onto neck 340 until ramp elements 326 pop beneath neck locking rim 350. Then, to unscrew cap 310, skirt portion 314 is counter-rotated against the retention forces provided by the ratchet engagement of the ramp elements, which prevent unthreading of the tamper-evidencing band. Once the counter-rotational forces are great enough, breakable connections 320 fracture, thereby releasing cap 310 to continue unscrewing from the neck.

The ratchet design of retaining rim 318 and neck 340 provides a design which ensures breaking of connections 320 and, in addition, provides sufficient surface area on the tops of ramp elements 326 to retain band 318 beneath locking rim 350. Inwardly directed pleats in combination with ramp elements prevent outward flexing of retaining rim 324. Most preferably, a plurality of drainage passageway 331 also are provided in rim 324.

An advantage a tamper-evidencing band including both pleats and a ratchet mechanism, in accordance with the present invention, is that such a configuration significantly facilitates the application of a tamper-evidencing closure on a neck or spout of a container. Closures that have tamper-evidencing bands provided with ratchets may be difficult to apply to a closure neck. In particular, tamper bands provided with ratchets are generally more rigid than tamper bands without ratchets and thus may break upon application of a closure to a neck. In particular, the ratchets may reduce elasticity of the band which may cause excess resistance when applying the closure to the neck which may intern damage the frangible connections. Similarly, because the bands with ratchets are relatively rigid, such bands may hamper the application of the closure to a container neck because due to the difficulty encountered as the band passes over a retaining rim of the closure. A closure including a tamper-evidencing band having both pleats and a ratchet mechanism, in accordance with the present invention, overcomes such disadvantages because the pleats provide the band with additional "give" or flexibility and/or substantially restores the "give" or flexibility lost due to the presence of the ratchet mechanism. Such configuration thus facilitates application of the closure to a container neck, and in particular, facilitates the band in passing over the retaining rim of the container.

FIGS. 20–26 show another alternative embodiment for the tamper-evidencing band of the present invention. Cap 410 is similar to caps 10, 110, 210 and 310 described above but includes modified plug, thread and tamper-evidencing band configurations. Cap 410 is dimensioned and configured to be applied to a threaded container neck 440 and generally includes a top 412, a skirt 414 and a tamper-evidencing band 418 attached to skirt 414 by a plurality of breakable connections 420.

FIG. 21 illustrates a threaded container neck 440 which can be used on a variety of containers in accordance with the present invention. For example, the illustrated container neck 440 can be utilized on five-gallon bottles of the type used in combination with inverted bottled water dispensers. Container neck 440 includes a locking surface in the form of an annular bead 442 and an annular base flange 446. The tamper-evidencing band of closure 410 locks underneath locking surface 442 and between the locking surface 442 and the annular base flange 446. Preferably, annular base flange 446 is dimensioned and configured such that the base flange prevents one from prying under tamper-evidencing band 418 in an attempt to remove cap 410 from neck 440 without affecting the tamper-evidencing band. Furthermore, annular base flange 446 provides a means for handling the container in a well known manner and also serves to protect the tamper-evidencing band of the present invention from damage by conventional container handling equipment.

As shown in FIG. 21, the internal side wall of cap skirt 414 includes an internal thread configuration having eight internal spiral thread beads or thread leads 422, six of which are shown. The external side wall of neck 440 includes an external thread configuration having four spiral thread beads or thread leads 444. Internal thread leads 422 are dimensioned and configured to pass over external thread leads 444 as cap 410 is applied to container neck 440 upon a downward movement of cap 410 onto container neck 440.

In the illustrated embodiment of FIGS. 20–26, the internal thread configuration of the cap has twice as many thread leads as the external thread configuration of the neck. One should appreciate that the actual number of thread leads may vary. For example, either the neck can have one, two, three or more thread leads while the cap skirt has twice as many thread leads, for example, two, four, six or more. One should also appreciate that the cap skirt can have two, three, four or more multiples of thread leads as the neck. For example, while the neck can have one, two, three or more thread leads, the cap skirt can have three, six, nine or more thread leads, or four, eight, twelve or more thread leads, and so on. One should further appreciate that the cap skirt may have any multiple of thread leads as the neck, provided that the threads on the neck have approximately the same helical angle as the threads on the cap skirt such that the at least one cap skirt thread cooperatively engages at least one neck thread. For example, the neck may be provided with fewer but courser threads while the cap skirt may be provided with more but finer threads than the neck.

One should also appreciate that the container neck can have twice as many thread leads as the cap skirt in accordance with the present invention. Similarly, the container neck can have two, three, four or more multiples of thread leads as the cap skirt in accordance with the present invention. One should also appreciate, however, that the number of threads provided on the neck may equal the number of threads provided on the cap skirt.

Advantageously, the thread configuration of the present invention, in which one of the container neck and the cap has twice as many thread leads as the other, minimizes spikes in application force during application of the cap to a container neck and also serves to minimize cross-threading.

As schematically shown in FIG. 26, an internal annular plug member 450 extends downwardly and outwardly from the underside of top 412. Plug member 450 mates with an upper internal wall surface 452 of container neck 440 to create a leak-proof seal to seal the opening of container neck 440, even if cap 410 has been cross-threaded onto container neck 440 and thus misaligned with the container neck. In particular, plug 450 extends downwardly and outwardly from the underside of cap top 412 at an angle such that a first outer diameter $D_1$ of the lower end of the plug is larger than a second outer diameter $D_2$ of the upper end of plug 450 which is joined to the underside of top 412. Advantageously, the outwardly-angled configuration of plug 450 ensures that the maximum outer diameter, that is, $D_1$ effectively seals against the inner surface 452 of container neck 440 even if cross-threading has occurred and closure 410 is misaligned with container neck 440.

Preferably, the outer wall surface of plug 450 extends from the underside of cap top 412 at an angle θ that is less than approximately 87°, more preferably in the range of approximately 75° to 85°, and most preferably in the range of approximately 81° to 83°. One should appreciate that other angle ranges may be used in accordance with the present invention. For example, the angle of plug may vary depending upon a number of factors including, but not limited to, diameter, length or height of the plug, the inner diameter of the container neck, and the outer diameter of the plug.

Referring again to FIG. 21, closure 410 includes a series of frangible connections 420 which connect band 418 to skirt 414 as with the above embodiments. Frangible connections 420 are formed by thin wall segments which have sufficient compressive rigidity to withstand the compressive forces imposed by tamper-evidencing band 418 as the closure is mounted onto a container neck 440, yet also has minimal tensile strength so that frangible connections 420 break as the closure is threaded back off of container neck 440. In particular, retaining rim 424 includes an upper free edge 426 which cooperates with annular locking bead 442 on container neck 440, as shown in FIG. 26. Free edge 426 abuts against and engages locking bead 442 as closure 410 is unthreaded from container neck 440. The cooperating configuration of free edge 426 and locking bead 442 prevents upward motion of tamper-evidencing band 418 thus producing breakage of the frangible connection of closure 410 when the closure is removed from the container neck.

As shown in FIG. 22, a series of nine approximately equidistantly spaced pleats 432 are formed in the upwardly and inwardly turned retaining rim 424. Pleats 432 are pleated radially outwardly of arcuate portions 430 in the same manner as pleats 32 discussed above. Preferably, retaining rim 424 has a pair of terminal ends 428 which form a gap where a tenth pleat would have been located, which gap segments retaining rim 424, as discussed in greater detail below.

Provision of the nine pleats and the gap creates ten arcuate portions 430 along free edge 426. Arcuate portions 430 have a radius of curvature that approximates the curvature of the container neck so that when closure 410 is mounted onto container neck 440, the upper edge 426 of each arcuate portion 430 is aligned to firmly grip locking bead 442, as shown in FIG. 26, upon removal of closure 410 from container neck 440. While the present invention is not meant to be limited to a particular number of pleats and/or gaps, it is desirable to provide at least one pleat and one gap in order to allow retaining rim 424 to "give" as closure 410 is applied to neck 440 and retaining rim 424 passes over locking bead 442. Thus, one, two, three or more pleats may be used in combination with one, two, three or more gaps in accordance with the present invention.

As shown in FIGS. 22 and 25, a line of weakness 429 is formed in the outer wall 423 of tamper-evidencing band 418. As shown in the illustrated embodiment, line of weakness may extend substantially vertically. It will be observed that the gap formed by terminal ends 428 is substantially aligned with line of weakness 429 located. As shown in FIG. 21, a foot or retention boss 445 is provided that secures an end portion 433 of tamper-evidencing band 418 to skirt 414 even as closure 410 is unthreaded from container neck 440. In particular, once frangible connectors 420 are broken as closure 410 is unthreaded from container neck 440, retention boss 445 remains connected to closure skirt 414 and pulls end portion 433 upward over locking bead 442. In turn, tamper-evidencing band 418 is separated along line of weakness 429, mainly because the remaining portion of the tamper-evidencing band 418 is prevented from upward motion due to the cooperation between free end 426 of band 418 and locking bead 442 of neck 440. Thus, tamper-evidencing band 418 remains with closure 410 even after the closure is removed from container neck 440.

While the improved locking surface engaging structure of the present invention enhances detection of tampering with the product, the inwardly turned rim 424 also provides a structure which can trap liquid between the closure and container neck 440 in a manner similar to that discussed above. Either product, or wash water, or both, can collect in the U-shaped annular volume or space 448 between annular wall 423 and rim 424, as can be seen, for example, in FIGS. 23 and 24. Passageways 431 formed in rim 424 at the bottom or inward bend of the rim will permit any liquids in space 448 to drain out of the closure or at least evaporate more readily so that they do not provide a habitat for mold and bacteria growth.

Most preferably, a passageway 431 is provided between each circumferentially adjacent pair of pleats 432 since pleats 432 tend to act as circumferential barriers to the migration of liquid past the pleats. In the illustrated embodiment of FIGS. 20–26, ten passageways 431 are provided for liquid drainage. One should appreciate, however, that one or more passageways can be utilized in accordance with the present invention.

When closure 410 is unscrewed off of container neck 440, retaining rim 424 engages locking surface 442. Due to the position of frangible connections 420 on the outside of locking surface 442, a slight torque is placed on the retaining rim, which may tend to cause retaining rim 424 to move outwardly toward annular wall 423. If this happens, pleats 432 engage an inner surface of band 418 and prevent upper free edge 426 of the retaining rim from moving outwardly from underneath locking surface 442, thus preventing the tamper-evidencing band to slip over the locking surface 442 without breaking the frangible connections 420.

Turning now to FIGS. 27(a)–(f), an exemplary method of forming the closure of the present invention in accordance with the present invention is illustrated. As shown schematically in FIG. 27(a), molding apparatus or mold 460 includes a cavity 462, a core 465, a core sleeve 468, and a stripper 470. Generally, cavity 462 is separable from core 465, as well as from core sleeve 468 and stripper 470. In the illustrated embodiment, core sleeve 468 is held stationary and core 465 and stripper 470 are movable with respect to core sleeve 468. Core 465 and stripper 470 are also movable with respect to one another. One should appreciate that other configurations can be used in accordance with the present invention. For example, one of core 465 or stripper 470 could be held stationary in which case remaining components would be movable with respect to the one stationary component.

Figure 27A:
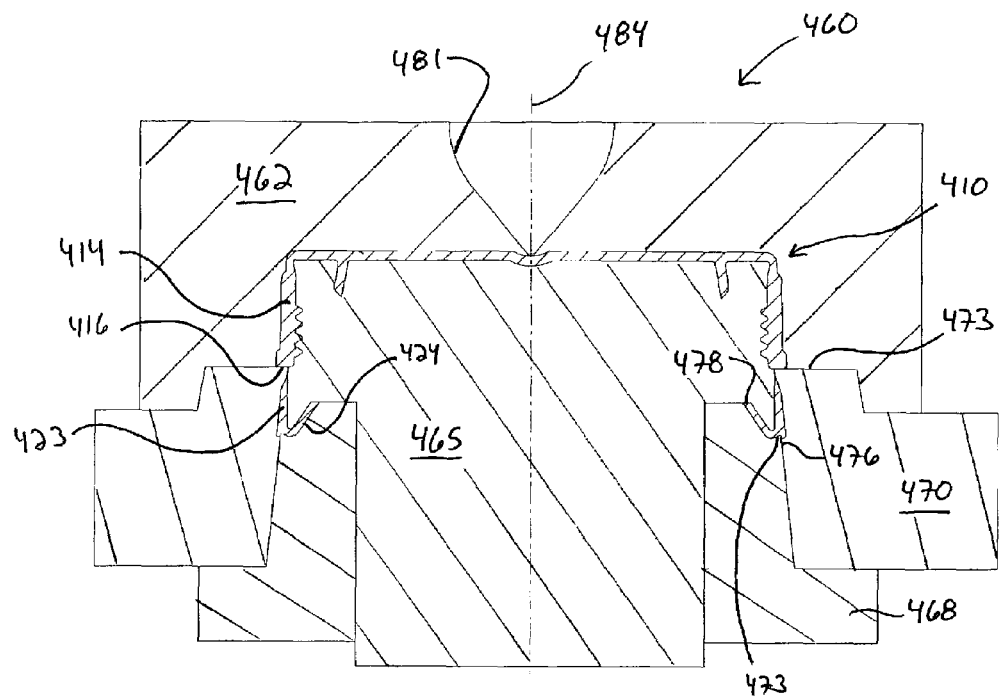
FIGS. 27(a)–(f) are schematic elevational views of a molding apparatus used to form a tamper-evidencing closure in accordance with the present invention.

FIG. 27(a) shows mold 460 of the present invention closed. Cavity 462 includes an injection port or runner 481 that is configured to receive a hot tip for the injection of molten plastic material into the mold. Although runner 481 is shown as oriented along a mold axis 484, it will be understood that cavity 462 may be configured such that it receives the hot tip in other orientations, for example, at an angle and/or offset from mold axis 484. One should also appreciate that, while mold 460 is shown having a generally vertical orientation, mold 460 preferably has a horizontal orientation, that is, mold axis 481 extends along a substantially horizontal axis while mold 460 is in use.

With continued reference to FIG. 27(a), the upper internal portion of cavity 462 determines the external shape of a closure, for example, the top and the skirt of closure 410. In particular, core 465 has an upper external surface which determines the internal shape of the top and the skirt of closure 410. The shape of the remainder of the closure is determined by the upper portions of core sleeve 468 and stripper 470. A lower surface of the closure's annular retaining rim 424 is formed by an upper surface core sleeve 468 and an outer surface of the cap's annular wall 423 is formed by an inner surface of stripper 470.

As can be seen in FIG. 27(a), the molding apparatus is configured such that in a closed position, a bottom surface of cavity 462 rests on top of stripper 470 thus forming a first parting line 473 located between lower edge 416 (see also FIG. 26) of closure skirt 414 and the upper edge of annular wall 423. In the closed position, an inner surfaces of stripper 470 rests on an outer surface of core sleeve 468 thus forming second parting line 476 located on a bottom edge of tamper-evident band 418 adjacent the corner formed by annular outer wall 423 and retaining rim 424. Preferably the second parting line 476 is spaced inwardly from the outer surface of outer wall 423 and is located adjacent to demolding facilitating structure, for example, groove or shoulder 473, as is discussed in greater detail below. In the closed position, a bottom surface of core 465 rests on top of core sleeve 468 thus forming a third parting line 478 located adjacent upper free edge 426 of tamper-evident band 418.

Figure 27B:
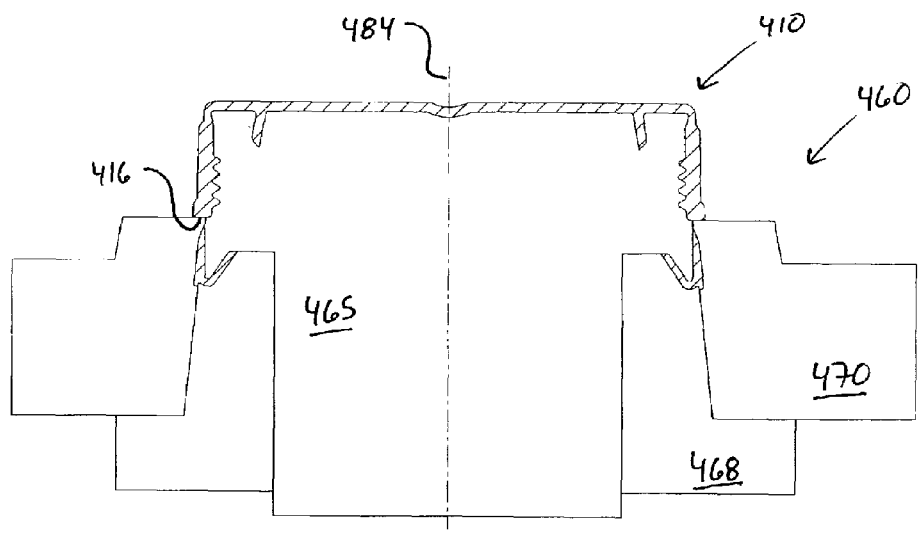

In operation and use, the mold assembly is closed at the commencement of a molding cycle and cavity 462, core 465, core sleeve 468 and stripper 470 are in the position shown in FIG. 27(a). Molten plastic material is injected through runner 481 into space formed within the closed mold to form closure 410. Next, cavity 462 is withdrawn along axis 484 away from core 465 and the remaining mold components thus leaving the external surfaces of cap 410 exposed as shown in FIG. 27(b).

Figure 27C:
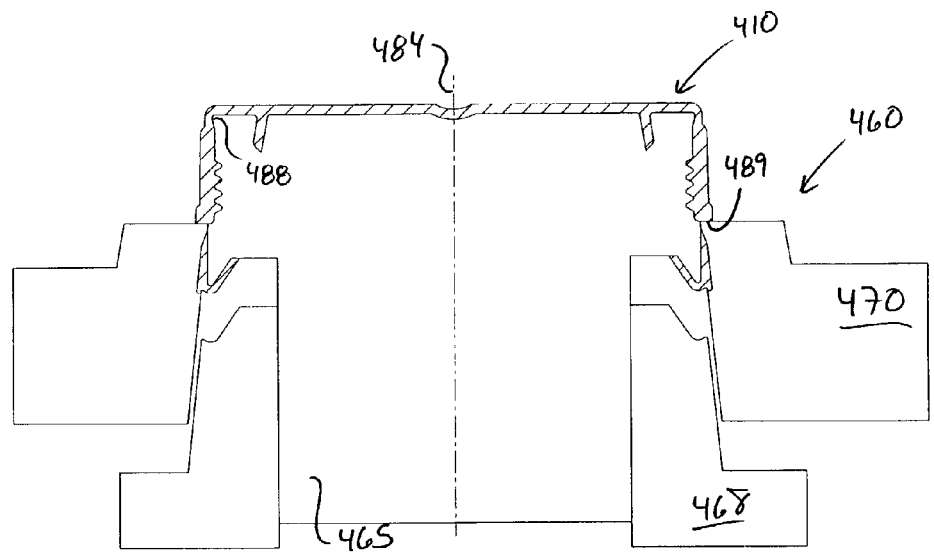

Next, core 465 stages forward in an upward direction with respect to core sleeve 468. Core 465 stages forward together with stripper 470 as shown in FIG. 27(c). In this stage of the molding cycle, the molded closure 410 moves in unison with core 465 and stripper 470 away from the stationary core sleeve 468.

Figure 27D:
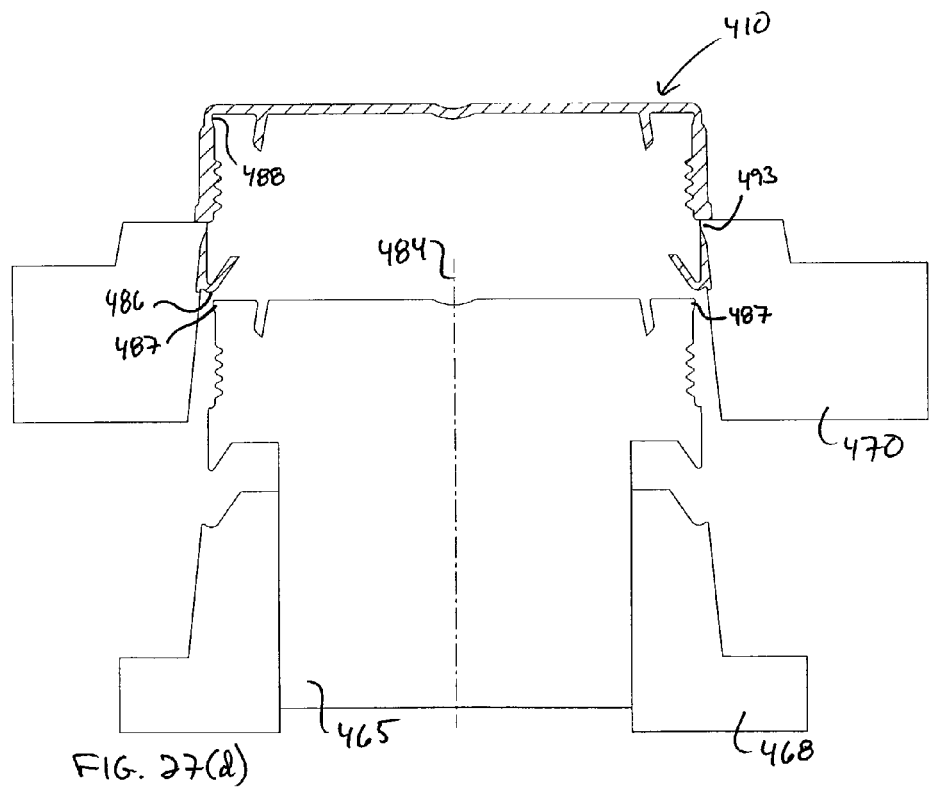
Figure 27E:
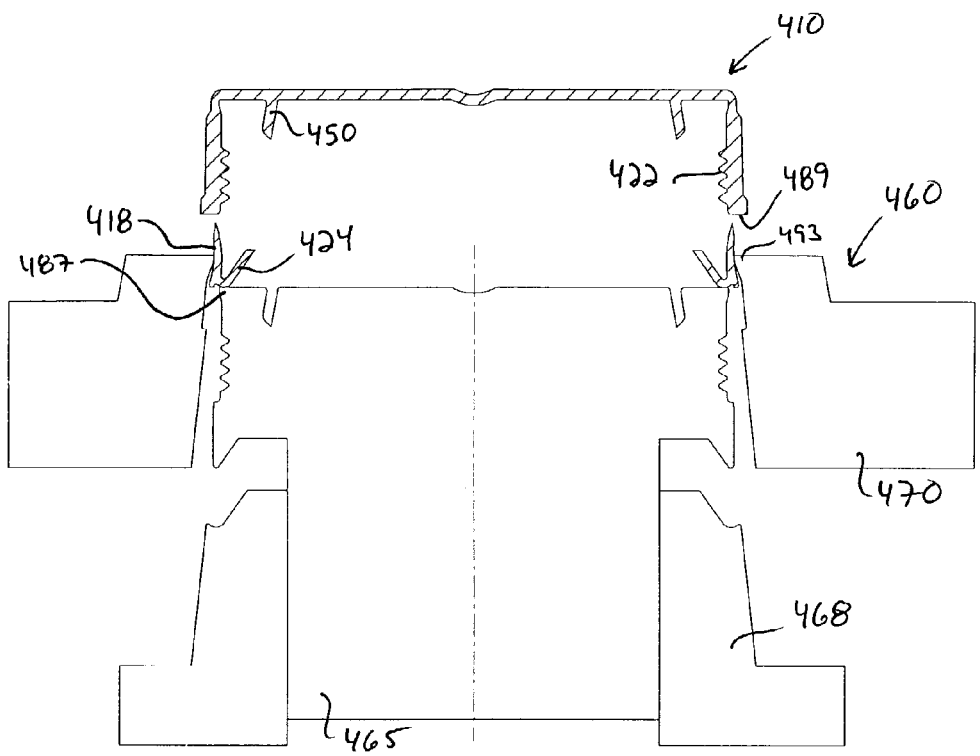
Figure 27F:
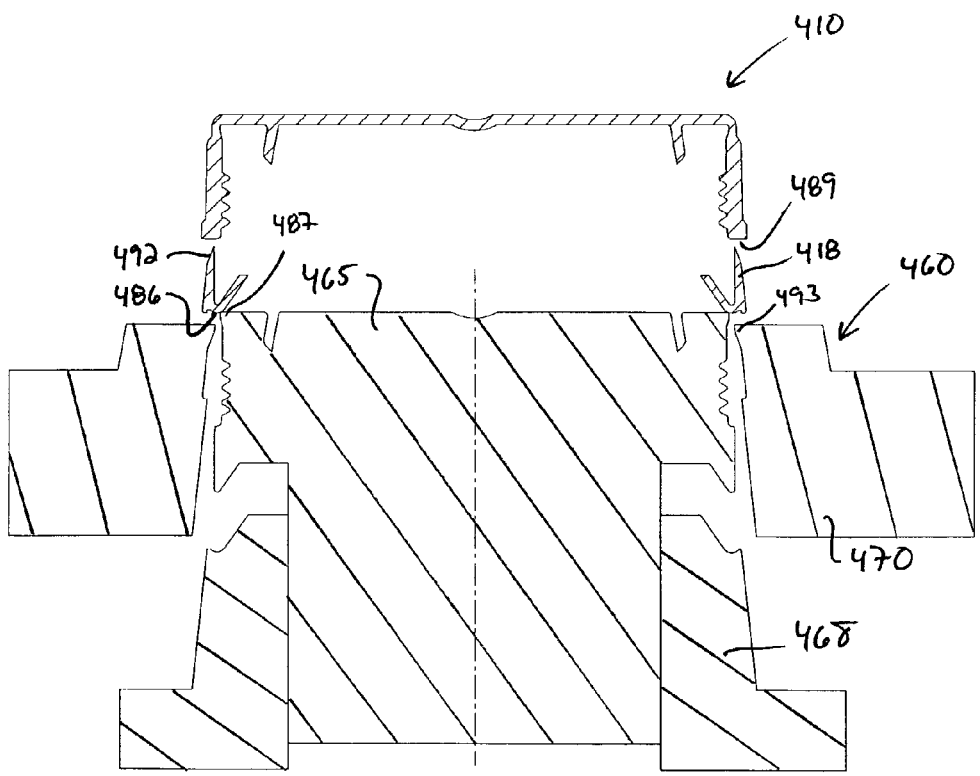

In the next stage of the molding cycle, core 465 stops in the position shown in FIG. 27(d) while stripper 470 continues to push closure 410 away from the stationary core sleeve 468 as well as the now stationary core 465. In this stage, closure 410, including its closure plug 450, closure threads 422, tamper-evident bead 418 and retaining rim 424 are disengaged from core 465. The "give" of the flexible plastic material forming the closure allows closure 410 to disengage the surface of core 465 without damaging the structure of closure 410. Furthermore, the tapered internal wall configuration of stripper 470 allows additional clearance for retaining rim 424 to momentarily flex downwardly thus allowing the retaining rim to pass between the outer surface of core 465 and the inner tapered surface of stripper 470.

In the next stage of the molding cycle, stripper 470 reverses direction and retracts with respect to core 465. During this stage, a bottom edge 486 of tamper-evidencing band 418 adjacent the intersection of outer wall 423 and retaining rim 424 abuts against a top surface of core 465 in a manner discussed below.

To facilitate demolding, cap 410 may include a recess 488, shown in FIGS. 24 and 27(*d*). Recess 488 allows the provision of extra material on an upper portion of core 465 that forms an outwardly extending radial core projection 487, as most clearly shown in FIG. 27(*d*). Core projection 487 forms extra land in the form of an increased upper shoulder surface that abuts against bottom edge 486 of tamper-evidencing band as stripper 470 retracts with respect to core 465, that is, from the position shown in FIG. 27(*d*) to the position shown in FIG. 27(*e*). Advantageously, the additional shoulder surface of the outwardly extending core projection 487 provides more interfacial contact between core 465 and tamper-evidencing band 418 which facilitates demolding of tamper-evidencing band 418 from stripper 470. The configuration of the outwardly extending core projection is particularly suited to minimize "sucking-in" of tamper-evidencing band 418 between stripper 470 and core 465.

Continued downward motion of stripper 470 causes closure 410 to disengage from stripper 470 as shown in FIG. 27(*f*). At this stage, closure 410 has been ejected from the mold and, in the case that mold axis 484 extends along a horizontal axis or substantially inclined axis, closure 410 falls under the force of gravity away from mold 460 and down to a hopper or other suitable collection device. One should appreciate that, in the event that the mold axis extends upwardly along a vertical axis, pneumatic or other mechanical devices may be used to propel the closure away from the mold.

Closure 410 includes several design features which further facilitate the demolding operation in accordance with the present invention. For example, outer skirt 414 includes a lower increased diameter ejection shoulder 489 which provides a wider surface or increased land surface on tamper-evidencing band 418 for stripper 470 to engage as the closure is ejected from core sleeve 468 and then core 465, as most clearly shown in FIG. 27(*f*). The configuration of cavity 462 and stripper 470 placing the first parting line 473 at the bottom edge of skirt 414 enables removal of a closure having such an ejection shoulder from the molding apparatus. Advantageously, the increased land of shoulder 489 also prohibits telescoping of tamper-evidencing band 418 with respect to cap skirt 414 when applying the cap to a container.

With continued reference to FIG. 27(*f*), the upper portion of tamper-evidencing band 418 includes a tapered upper wall surface 492 which further facilitates demolding closure 410 from mold 460. In particular, tapered wall surface 492 facilitates release of the outer surface of tamper-evidencing band 418 from an inner band-engaging surface stripper 470 and passing the skirt engaging radial projection 493 of stripper 470 which is most clearly seen in FIG. 27(*f*). Also, tapered wall surface 492 allows the provision of radial projection 493 extending inwardly from an upper portion of stripper ring 470. Advantageously, radial projection 493 provides an increased shoulder to further facilitate demolding of cap 410 from mold 460 which contacts both increased diameter portion 489 and bottom edge 486 during the respective mold stages illustrated in FIGS. 27(*d*) and 27(*f*).

The configuration of mold 460 allows molding of closure 410 with the retaining rim 424 in its final position, that is, extending upwardly and inwardly such that upper free edge 426 faces the underside of top 412 as shown in FIGS. 27(*a*) and 27(*f*). Such configuration simplifies production of closures having such a retaining rim by eliminating the need for additional steps necessary to work the closure into a final useable configuration. For example, prior closures are generally molded with a retaining rim of the tamper-evidencing band pointing downwardly. With such prior closures, an additional step is necessary to fold the retaining rim from its downward "molded" position to a "final" position in which the retaining rim points upwardly.

Advantageously, the configuration of molding apparatus 460 in accordance with the present invention does not require the use of poppet valves or push pins or other mechanical structure for demolding or removing the closure cap from the molding apparatus.

Figure 32:
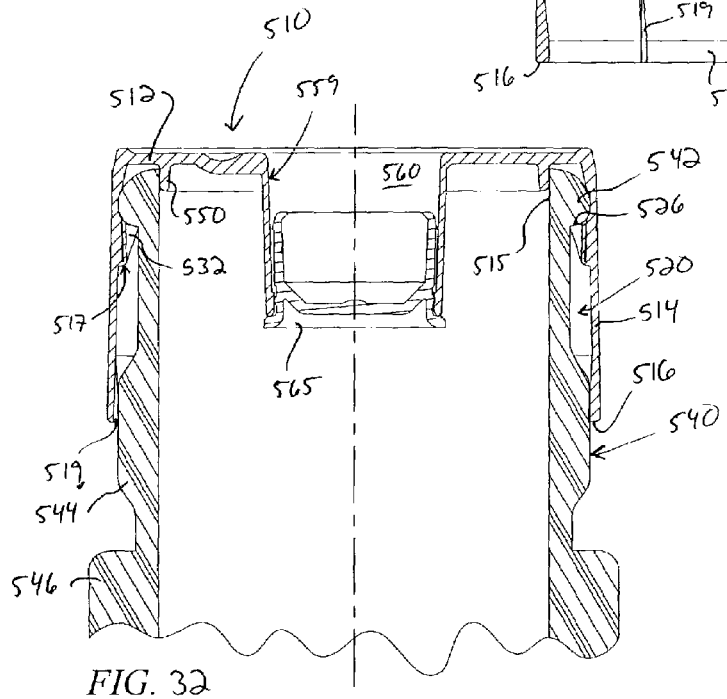
FIG. 32 is a cross-sectional view of the tamper-evidencing closure of FIG. 28 mounted on a container neck.

FIGS. 28–32 show another alternative embodiment for a tamper-evidencing closure in accordance with the present invention. Closure 510 is similar in some aspects to caps 10, 110, 210, 310 and 410 described above but is configured to be used with a conventional five-gallon water bottle having a threadless neck finish, as shown in FIG. 32.

FIGS. 28–32 illustrate a closure 510 that can be used with a variety of containers in accordance with the present invention. For example, the illustrated closure can be used in combination with five-gallon bottles of the type that are inverted and placed in a bottled water dispenser. Preferably, closure 510 is used in combination with a container having a container neck 540 that includes a locking surface in the form of an annular bead 542 spaced above an intermediate bead 544 and an annular base flange 546.

Closure 510 is formed of plastic or other suitable materials in accordance with the present invention including, but not limited to, low-density polyethylene. The material of closure 510, together with the generally thin-walled construction of the cap, provide for a closure which tightly conforms to the crown of container neck 540.

Figure 30:
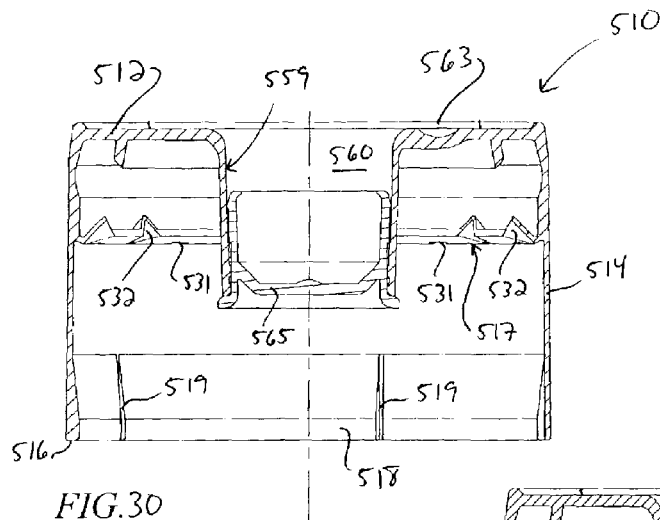
FIG. 30 is a cross-sectional side view of the tamper-evidencing closure of FIG. 28 taken along line 30—30 of FIG. 29.
Figure 31:
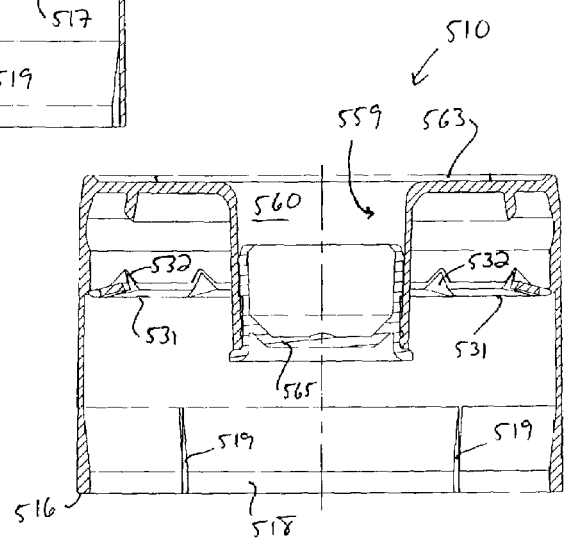
FIG. 31 is a cross-sectional side view of the tamper-evidencing closure of FIG. 28 taken along line 31—31 of FIG. 29.

As shown in FIG. 30, closure 510 is similar in some aspects to that shown by U.S. Pat. No. 6,102,226 to Verderber and by U.S. Pat. No. 6,177,041 to Bietzer, the entire contents of which patents is incorporated herein by this reference. Closure 510 generally includes a top 512, an annular skirt 514, an optional tear tab extending downwardly from said skirt below a lower edge 516, and a locking structure 517.

Annular skirt 514 depends downwardly from a periphery of top 512 and is dimensioned and configured to securely abut against annular base flange 546 of container neck 540. Preferably, annular skirt 514 is dimensioned and configured such that a thickened lower portion 518 securely abuts against annular intermediate bead 544, as shown in FIG. 32. Such configuration of annular skirt 514 and lower portion 518 prevents one from prying under locking structure 517 in an attempt to remove cap 510 from neck 540 without tearing or otherwise damaging skirt 514. Advantageously, the configuration of skirt 514 and lower portion 518 also prevents dirt and other contaminants from entering and contaminating a void area 520 formed between container neck 540 and closure skirt 514, as shown in FIG. 32.

In the illustrated embodiment, thickened lower portion 518 of skirt 514 includes a plurality of lines of weakness 519 which extend upwardly through lower portion 518. The lines of weakness may include vertically extending frangible grooves or other suitable frangible means in accordance with the present invention. In either case, scorelines 519 are configured to break if somebody attempts to pry skirt 514 away from intermediate bead 544 and thus prevent someone from overcoming the tamper-evidencing features of closure 510.

In one embodiment, an internal annular plug member 550 extends downwardly and outwardly from the underside of top 512, as illustrated in FIG. 30. Plug member 550 mates with an upper internal wall surface 515 of container neck 540 to create a leak-proof seal to seal the opening of container neck 540 in a manner similar to plug member 450 described above.

Annular top 512 of closure 510 is formed with a central well 559 having a cylindrical side wall 560 which extends downwardly from an underside of top 512. Preferably, a tamper-evidencing label 563 covers well 559 in a well-known manner. As shown in FIG. 30, the lower end of well 559 is closed by a removable plug 565. One should appreciate that the structural configuration of the well and plug may vary in accordance with the present invention. For example, the structural configuration of the closure of the present invention may be similar to that of the closure disclosed by U.S. Pat. No. 5,232,125 to Adams, the entire content of which is incorporated herein by this reference.

Closure 510 is a tamper-evident closure as the configuration of label 563 prevents undetected access to well 559 and/or tampering with plug 565. In particular, one cannot gain access through well 559 to the container upon which closure 510 is applied until at least a portion of label is torn away from closure 510, in which case, the torn label provides evidence that there may have been tampering with the contents of the container.

Figure 28:
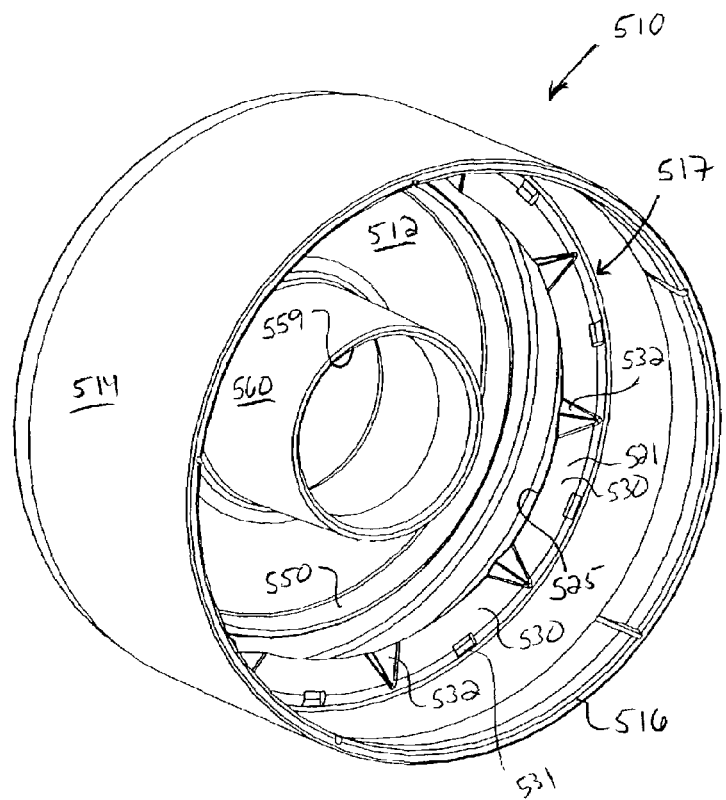
FIG. 28 is a perspective view of another tamper-evidencing closure in accordance with the present invention.

Unlike prior closures, locking structure 517 includes an internal locking ring 521 for securing closure 510 to neck 540 instead of threads or a locking bead. As shown in FIG. 28, locking ring 521 includes an upper free edge 525 which cooperates with annular locking bead 542 on container neck 540, as shown in FIG. 32. Namely, upper free edge 525 abuts against and engages locking bead 542 and prevents upward motion of skirt 514 with respect to container neck 540.

Figure 29:
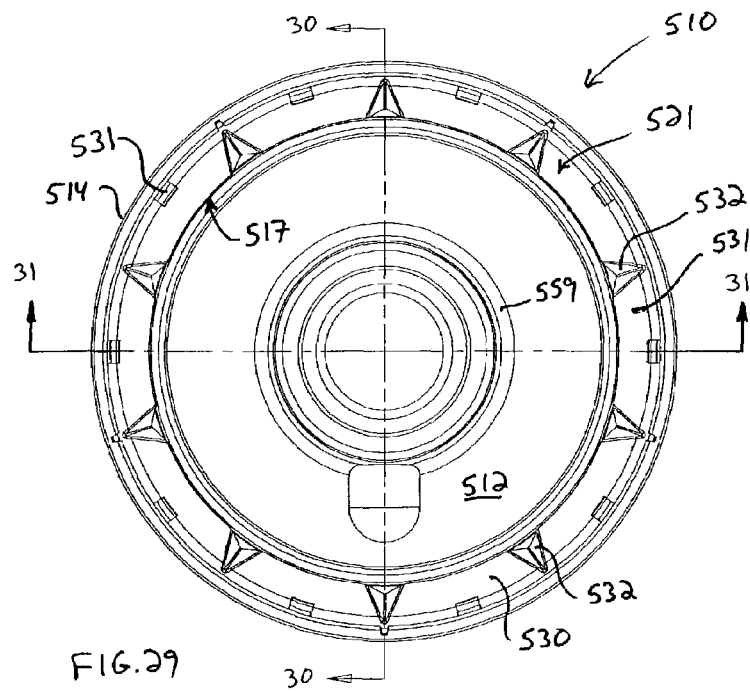
FIG. 29 is a bottom plain view of the tamper-evidencing closure of FIG. 28.

As shown in FIG. 29, a series often approximately equidistantly spaced pleats 532 are formed in the upwardly and inwardly turned locking ring 521. Pleats 532 are pleated radially outwardly of arcuate portions 530 in the same manner as pleats 32 discussed above. Provision of the ten pleats creates ten arcuate portions 530 along free edge 525. Arcuate portions 530 have a radius of curvature that approximates the curvature of the container neck so that when closure 510 is mounted onto container neck 540, the upper edge 525 of each arcuate portion 530 is aligned to abut against locking bead 542, as shown in FIG. 32. While the present invention is not meant to be limited to a particular number of pleats and/or gaps, it is desirable to provide at least two pleats in order to allow locking ring 521 to "give" as closure 510 is applied to neck 540 and as locking ring 521 passes over locking bead 542. Thus, two, three, four or more pleats may be used accordance with the present invention.

While the improved locking structure of the present invention enhances detection of tampering with the product, the inwardly turned locking ring 521 also provides a structure which can trap liquid between the closure and container neck 540 in a manner similar to retaining rim 24 discussed above. Either product, or wash water, or both, can collect in the U-shaped annular volume or space between annular skirt 514 and locking ring 521, as can be seen, for example, in FIG. 32. Passageways 531 formed in locking ring 521 at the bottom or inward bend of the ring will permit any liquids within the space to drain out of the closure or at least evaporate more readily so that they do not provide a habitat for mold and bacteria growth.

Most preferably, a passageway 531 is provided between each circumferentially adjacent pair of pleats 532 since pleats 532 tend to act as circumferential barriers to the migration of liquid past the pleats. In the illustrated embodiment of FIGS. 28–32, ten passageways 531 are provided for liquid drainage. One should appreciate, however, that one or more passageways can be utilized in accordance with the present invention.

In use, when closure 510 is applied to container neck 540, it seats on the container neck and cannot be manually removed from the bottle. When the empty bottle bearing closure 510 is returned to a bottle facility, closure 510 can be removed from the bottle with a decapping machine.

Locking structure 517 is substantially destroyed upon removal, as is skirt 514, when returned to the bottling facility. Thus, closure 510 may only be used once. This configuration is advantageous when used in combination with returnable bottles because such configuration prevents misuse of the returnable bottle. For example, since the locking bead is inoperable once a user tears the skirt through the locking structure, a user cannot reuse the cap to reseal the container. Advantageously, this configuration discourages misuse of returnable bottles and, in particular, discourages the reuse of returnable bottles to store possibly harmful and dangerous substances.

For convenience in explanation and accurate definition in the appended claims, the terms "up" or "upper", "down" or "lower", "inside" and "outside" are used to describe features of the present invention with reference to the positions of such features as displayed in the figures.

In many respects the modifications of the various figures resemble those of preceding modifications and the same reference numerals designate corresponding parts.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A closure for sealing the opening of a container having a radially extending locking bead, said closure comprising:
    a top having a periphery;
    an annular skirt depending downwardly from said periphery and including a lower edge and a line of weakness extending upwardly from said lower edge;
    a tear tab extending downwardly from said skirt below said lower edge; and
    a tamper-evidencing locking member including an inwardly extending locking ring that extends radially inwardly from said skirt intermediate said top and said bottom edge, the retaining rim including a free edge that is adapted to engage the radially extending locking bead of the container when the closure is removed from the container neck;

wherein said locking ring includes an outwardly directed pleat.

2. The closure of claim 1 wherein said locking ring extends radially inwardly and axially upwardly so tat said free edge of said locking ring prevents upward movement of said locking ring with respect to the container.

3. The closure of claim 1 wherein said line of weakness is a scoreline extending vertically from said lower edge.

4. A closure for sealing the opening of a container having a radially extending locking bead, said closure comprising:
a top having a periphery;
an annular skirt depending downwardly from said periphery and including a lower edge and a line of weakness extending upwardly from said lower edge;
a tear tab extending downwardly from said skirt below said lower edge; and
a tamper-evidencing locking member including an inwardly extending locking ring that extends radially inwardly from said skirt intermediate said top and said bottom edge, the retaining rim including a free edge that is adapted to engage the radially extending locking bead of the container when the closure is removed from the container neck;
wherein said locking ring includes a plurality of outwardly directed pleats.

5. The closure of claim 4 wherein said locking ring extends radially inwardly and axially upwardly so that said free edge of said locking ring prevents upward movement of said locking ring with respect to the container.

6. The closure of claim 4 wherein said line of weakness is a scoreline extending vertically from said lower edge.

7. A closure for sealing the opening of a container having a radially extending locking bead, said closure comprising:
a top having a periphery;
an annular skirt depending downwardly from said periphery and including a lower edge and a line of weakness extending upwardly from said lower edge; and
a tamper-evidencing locking member including an inwardly extending flexible locking ring that extends radially inwardly and upwardly from said skirt intermediate said top and said bottom edge, the retaining rim including a free edge that is adapted to engage the radially extending locking bead of the container when the closure is removed from the container neck;
wherein said locking ring includes an outwardly directed pleat.

8. The closure of claim 7 wherein said line of weakness is a scoreline extending vertically from said lower edge.

9. The closure of claim 7 wherein said locking ring extends radially inwardly and axially upwardly so that said free edge of said locking ring prevents upward movement of said looking ring with respect to the container.

10. The closure of claim 7 further comprising a tear tab extending downwardly from said skirt below said lower edge.

11. The closure of claim 7 wherein said locking ring includes a plurality of outwardly directed pleats.

* * * * *